(12) United States Patent
Tucker

(10) Patent No.: US 11,684,853 B1
(45) Date of Patent: Jun. 27, 2023

(54) INTERACTIVE PUZZLE

(71) Applicant: Diane Tucker, New York, NY (US)

(72) Inventor: Diane Tucker, New York, NY (US)

(*) Notice: Subject to any disclaimer, the term of this patent is extended or adjusted under 35 U.S.C. 154(b) by 0 days.

(21) Appl. No.: 17/722,311

(22) Filed: Apr. 16, 2022

Related U.S. Application Data

(60) Provisional application No. 63/329,362, filed on Apr. 8, 2022.

(51) Int. Cl.
*A63F 13/533* (2014.01)
*G06F 3/04842* (2022.01)
*A63F 13/52* (2014.01)
*A63F 13/80* (2014.01)

(52) U.S. Cl.
CPC ............ *A63F 13/533* (2014.09); *A63F 13/52* (2014.09); *A63F 13/80* (2014.09); *G06F 3/04842* (2013.01); *A63F 2300/308* (2013.01); *A63F 2300/8094* (2013.01)

(58) Field of Classification Search
CPC ........ A63F 13/533; A63F 13/52; A63F 13/80; A63F 2300/308; A63F 2300/8094; G06F 3/04842
See application file for complete search history.

(56) References Cited

U.S. PATENT DOCUMENTS

| | | | | |
|---|---|---|---|---|
| 10,052,558 B2* | 8/2018 | Ilchyshyn | ................ | A63F 13/40 |
| 2006/0170156 A1* | 8/2006 | Fabrige | .................. | D05C 17/00 |
| | | | | 273/157 R |
| 2008/0141180 A1* | 6/2008 | Reed | ........................ | G06F 16/40 |
| | | | | 715/854 |
| 2008/0293469 A1* | 11/2008 | Murakoshi | .............. | A63F 13/00 |
| | | | | 463/43 |
| 2010/0273554 A1* | 10/2010 | Leftwich | ................ | A63F 13/46 |
| | | | | 463/31 |
| 2011/0145027 A1* | 6/2011 | Mihai | .................... | G06Q 30/06 |
| | | | | 705/7.11 |
| 2011/0244937 A1* | 10/2011 | Yamashita | .............. | A63F 13/42 |
| | | | | 463/43 |
| 2012/0077165 A1* | 3/2012 | Liang | ..................... | G09B 11/06 |
| | | | | 434/261 |
| 2013/0084928 A1* | 4/2013 | Kasai | .................. | A63F 3/00643 |
| | | | | 463/9 |
| 2014/0189507 A1* | 7/2014 | Valente | ................... | G06T 11/60 |
| | | | | 715/705 |

(Continued)

*Primary Examiner* — Malina D. Blaise
(74) *Attorney, Agent, or Firm* — William E. Wooten; WEW IP Law PLLC

(57) ABSTRACT

The present disclosure is directed to an interactive puzzle. In particular, the methods and systems of the present disclosure may: generate data representing a graphical user interface (GUI); and receive user input via one or more user-manipulable control elements of the GUI such that one or more of a plurality of different, distinct, visibly distinguishable, continuous, and extensible line elements expand and/or contract along their one or more predetermined associated paths in an image area of the GUI to form a line drawing comprising at least a humanly discernible portion of at least one image, of a plurality of different and distinct images that may be rendered in the image area, that constitutes at least a portion of a solution to a user-solvable puzzle associated with the plurality of different and distinct images.

20 Claims, 26 Drawing Sheets

(56) References Cited

U.S. PATENT DOCUMENTS

| | | | |
|---|---|---|---|
| 2015/0057059 A1* | 2/2015 | Ilchyshyn | A63F 13/80 463/9 |
| 2016/0151703 A1* | 6/2016 | Lee | A63F 13/426 463/9 |
| 2020/0108307 A1* | 4/2020 | Pieters | A63F 9/10 |
| 2021/0141512 A1* | 5/2021 | Kodisoja | A63F 13/80 |

* cited by examiner

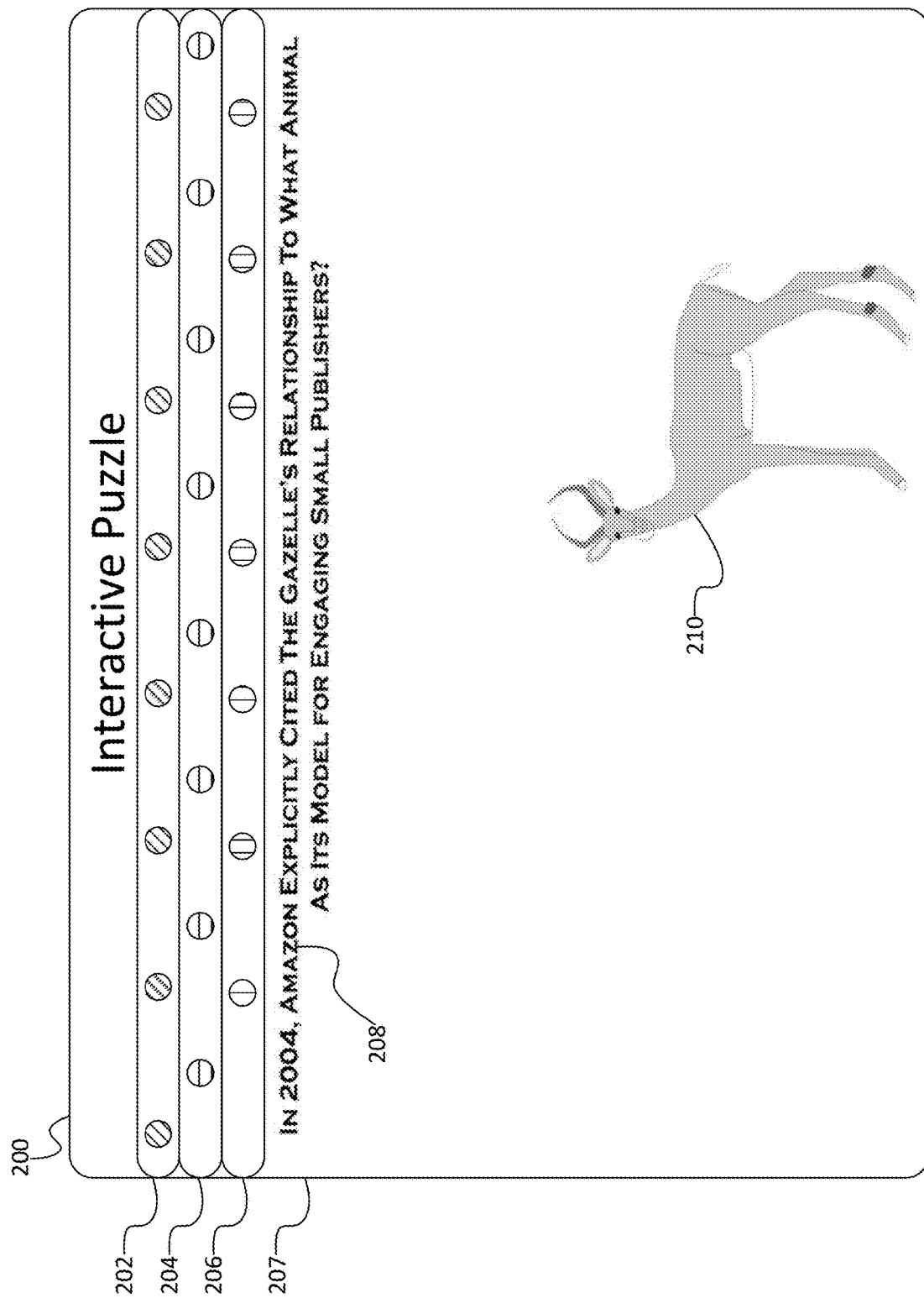

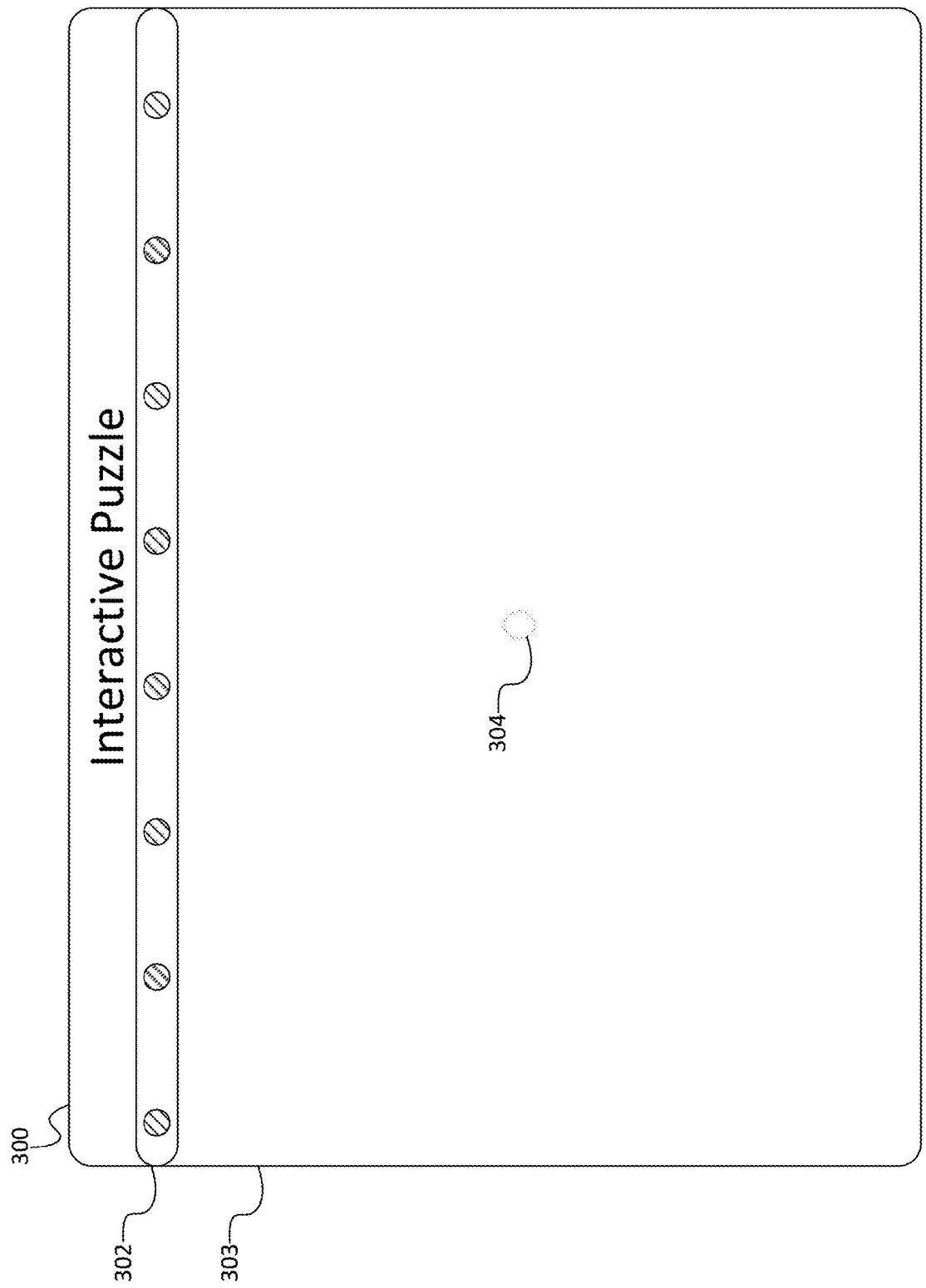

INTERACTIVE PUZZLE

PRIORITY CLAIM

This application claims priority to U.S. Provisional Patent Application Ser. No. 63/329,362, filed Apr. 8, 2022, and entitled "INTERACTIVE PUZZLE," the disclosure of which is incorporated herein by reference in its entirety.

FIELD

The present disclosure relates generally to puzzles. More particularly, the present disclosure relates to interactive puzzles.

BACKGROUND

Computing devices (e.g., desktop computers, laptop computers, tablet computers, set-top devices, smartphones, wearable computing devices, and/or the like) are ubiquitous in modern society. They may support communications between their users, provide their users with entertainment, information about their environments, current events, the world at large, and/or the like.

SUMMARY

Aspects and advantages of embodiments of the present disclosure will be set forth in part in the following description, or may be learned from the description, or may be learned through practice of the embodiments.

One example aspect of the present disclosure is directed to a method. The method may include generating, by one or more computing devices, data representing a graphical user interface (GUI). The GUI may comprise an image area for rendering a plurality of different and distinct images including at least one image that constitutes at least a portion of a solution to a user-solvable puzzle associated with the plurality of different and distinct images. The GUI may also comprise one or more user-manipulable control elements configured to cause one or more of a plurality of different, distinct, visibly distinguishable, continuous, and extensible line elements to at least one of expand or contract along one or more predetermined associated paths in the image area to form a line drawing comprising at least a humanly discernible portion of the at least one image that constitutes the at least a portion of the solution to the user-solvable puzzle associated with the plurality of different and distinct images. The method may also include receiving, by the computing device(s), user input via the user-manipulable control element(s) such that the one or more of the plurality of different, distinct, visibly distinguishable, continuous, and extensible line elements at least one of expand or contract along their predetermined associated path(s) in the image area to form the line drawing comprising at least the humanly discernible portion of the at least one image that constitutes the at least a portion of the solution to the user-solvable puzzle associated with the plurality of different and distinct images.

Another example aspect of the present disclosure is directed to a system. The system may include one or more processors, and a memory storing instructions that when executed by the processor(s) cause the system to perform operations. The operations may include generating data representing a GUI. The GUI may comprise an image area for rendering a plurality of different and distinct images including at least one image that constitutes at least a portion of a solution to a user-solvable puzzle associated with the plurality of different and distinct images. The GUI may also comprise one or more user-manipulable control elements configured to cause one or more of a plurality of different, distinct, visibly distinguishable, continuous, and extensible line elements to at least one of expand or contract along one or more predetermined associated paths in the image area to form a line drawing comprising at least a humanly discernible portion of the at least one image that constitutes the at least a portion of the solution to the user-solvable puzzle associated with the plurality of different and distinct images. The operations may also include receiving user input via the user-manipulable control element(s) such that the one or more of the plurality of different, distinct, visibly distinguishable, continuous, and extensible line elements at least one of expand or contract along their predetermined associated path(s) in the image area to form the line drawing comprising at least the humanly discernible portion of the at least one image that constitutes the at least a portion of the solution to the user-solvable puzzle associated with the plurality of different and distinct images.

A further example aspect of the present disclosure is directed to one or more non-transitory computer-readable media comprising instructions that when executed by one or more computing devices cause the computing device(s) to perform operations. The operations may include generating data representing a GUI. The GUI may comprise an image area for rendering a plurality of different and distinct images including at least one image that constitutes at least a portion of a solution to a user-solvable puzzle associated with the plurality of different and distinct images. The GUI may also comprise one or more user-manipulable control elements configured to cause one or more of a plurality of different, distinct, visibly distinguishable, continuous, and extensible line elements to at least one of expand or contract along one or more predetermined associated paths in the image area to form a line drawing comprising at least a humanly discernible portion of the at least one image that constitutes the at least a portion of the solution to the user-solvable puzzle associated with the plurality of different and distinct images. The operations may also include receiving user input via the user-manipulable control element(s) such that the one or more of the plurality of different, distinct, visibly distinguishable, continuous, and extensible line elements at least one of expand or contract along their predetermined associated path(s) in the image area to form the line drawing comprising at least the humanly discernible portion of the at least one image that constitutes the at least a portion of the solution to the user-solvable puzzle associated with the plurality of different and distinct images.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in this specification, which makes reference to the appended figures, in which:

FIGS. 2A-J depict example interfaces according to example embodiments of the present disclosure;

DETAILED DESCRIPTION

With reference now to the Figures, example embodiments of the present disclosure will be discussed in further detail.

Figure 1:
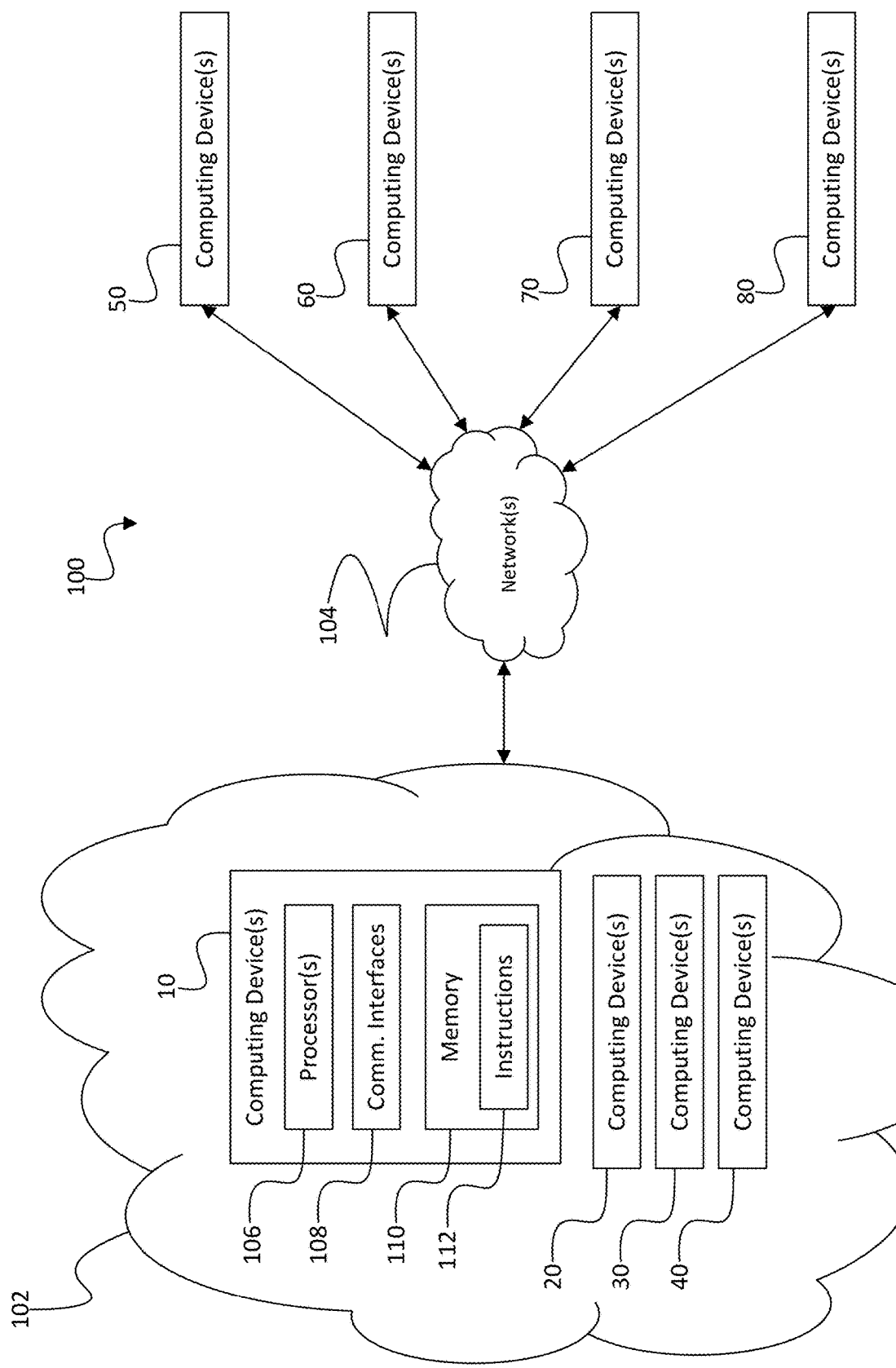
FIG. 1 depicts an example computing environment according to example embodiments of the present disclosure.

FIG. 1 depicts an example computing environment according to example embodiments of the present disclosure.

Referring to FIG. 1, environment 100 may include one or more computing devices (e.g., one or more desktop computers, laptop computers, set-top devices, tablet computers, mobile devices, smartphones, wearable devices, servers, and/or the like). For example, environment 100 may include computing devices 10, 20, 30, 40, 50, 60, 70, and/or 80, any one of which may include one or more associated and/or component computing devices (e.g., a mobile device and an associated wearable device, one or more associated servers, and/or the like). Environment 100 may also include one or more networks, for example, network(s) 102 and/or 104 (e.g., one or more wired networks, wireless networks, and/or the like). Network(s) 102 may interface computing device(s) 10, 20, 30, and/or 40, with one another and/or computing device(s) 50, 60, 70, and/or 80 (e.g., via network(s) 104, and/or the like).

Computing device(s) 10 may include one or more processor(s) 106, one or more communication interfaces 108, and memory 110 (e.g., one or more hardware components for storing executable instructions, data, and/or the like). Communication interface(s) 108 may enable computing device(s) 10 to communicate with computing device(s) 20, 30, 40, 50, 60, 70, and/or 80 (e.g., via network(s) 102, 104, and/or the like). Memory 110 may include (e.g., store, and/or the like) instructions 112. When executed by processor(s) 106, instructions 112 may cause computing device(s) 10 to perform one or more operations, functions, and/or the like described herein. It will be appreciated that computing device(s) 20, 30, 40, 50, 60, 70, and/or 80 may include one or more of the components described above with respect to computing device(s) 10.

Unless explicitly indicated otherwise, the operations, functions, and/or the like described herein may be performed by computing device(s) 10, 20, 30, 40, 50, 60, 70, and/or 80 (e.g., by computing device(s) 10, 20, 30, 40, 50, 60, 70, or 80, by any combination of one or more of computing device(s) 10, 20, 30, 40, 50, 60, 70, and/or 80, and/or the like).

FIGS. 2A-J depict example interfaces according to example embodiments of the present disclosure.

For example, referring to FIG. 2A, computing device(s) 10 (e.g., one or more user devices, and/or the like) and/or (e.g., via network(s) 102, 104, and/or the like) computing device(s) 50 (e.g., one or more servers, and/or the like) may generate, communicate, and/or the like data representing GUI 200, and/or the like, which computing device(s) 10 may (e.g., based at least in part on such data, and/or the like) render, display, provide to a user, and/or the like. As illustrated, GUI 200 may comprise (e.g., visibly, invisibly, as one or more displayed and/or un-displayed aspects of one or more touch controls, and/or the like) multiple different and distinct user-manipulable control elements 202, 204, 206, and/or the like. GUI 200 may also comprise image area 207, which may be configured to render, display, provide to a user, and/or the like a plurality of different and distinct images (e.g., associated with a user-solvable puzzle, and/or the like). In some embodiments, image area 207 may include one or more elements 208 (e.g., one or more text elements, and/or the like) 210 (e.g., one or more graphics, and/or the like) posing a question, prompting a response, providing a clue, and/or the like, e.g., regarding at least one aspect of a solution to the user-solvable puzzle, and/or the like.

Figure 2B:
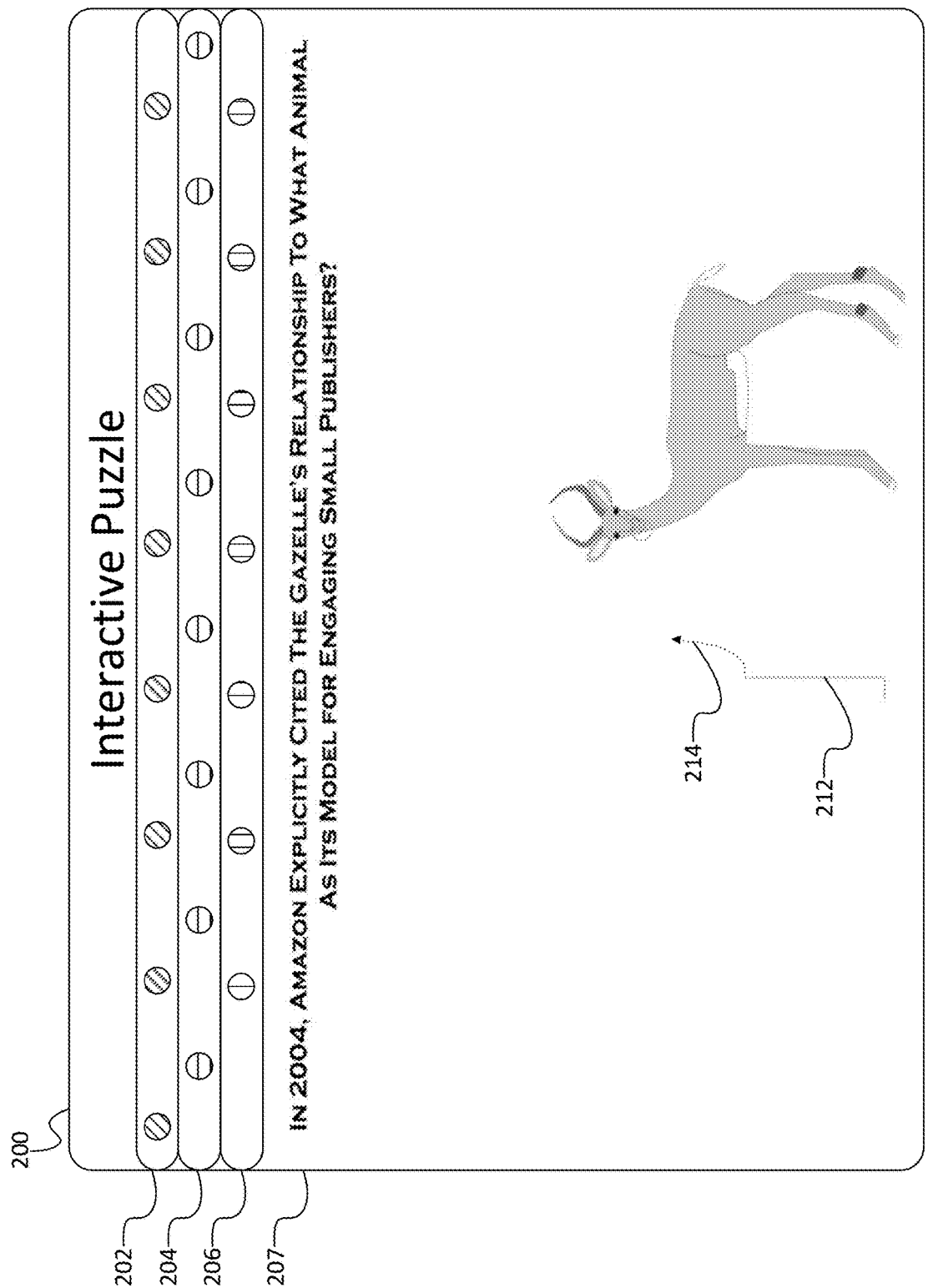
Figure 2C:
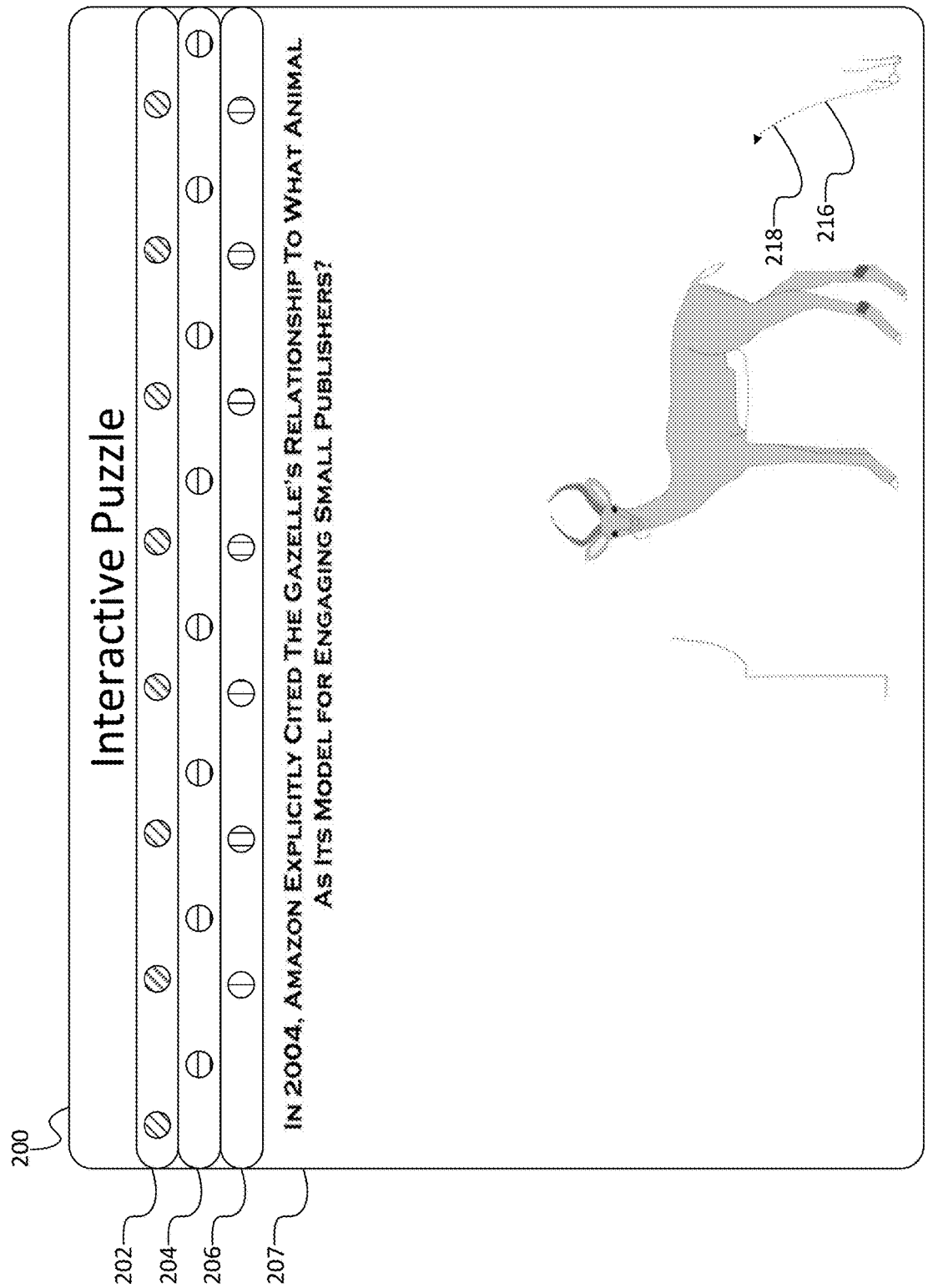
Figure 2D:
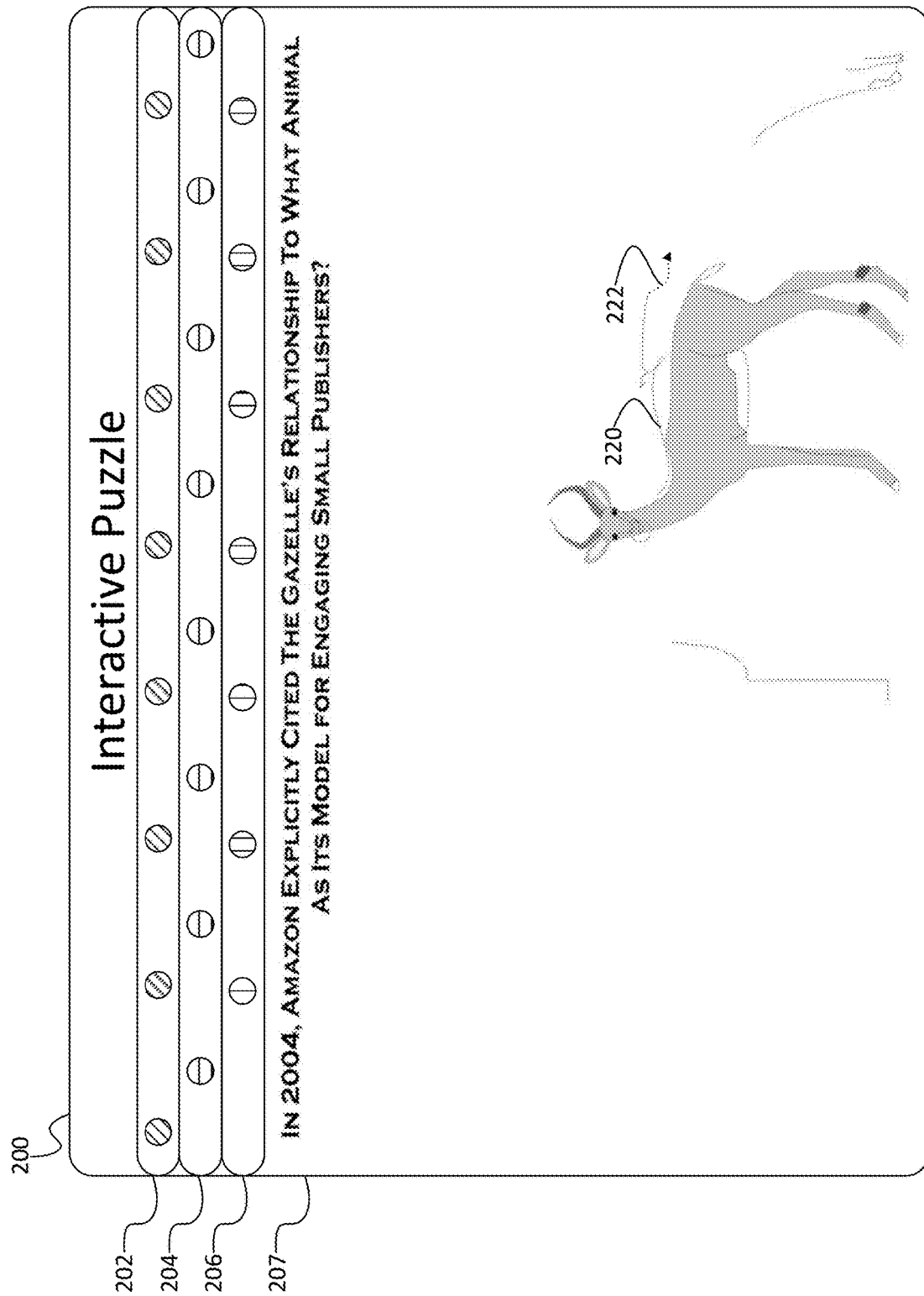

Referring to FIG. 2B, control element 202 may be configured to (e.g., responsive to receiving corresponding user input via control element 202, and/or the like) cause one or more of a plurality of different, distinct, visibly distinguishable, continuous, and extensible line elements (e.g., element 212, and/or the like) to at least one of expand or contract along one or more predetermined associated paths (e.g., path 214, and/or the like) in image area 207 to form one or more portions of a line drawing, and/or the like. Similarly, referring to FIG. 2C, control element 204 may be configured to (e.g., responsive to receiving corresponding user input via control element 204, and/or the like) cause one or more of the plurality of different, distinct, visibly distinguishable, continuous, and extensible line elements (e.g., element 216, and/or the like) to at least one of expand or contract along one or more predetermined associated paths (e.g., path 218, and/or the like) in image area 207 to form one or more portions of the line drawing, and/or the like; and referring to FIG. 2D, control element 206 may be configured to (e.g., responsive to receiving corresponding user input via control element 206, and/or the like) cause one or more of the plurality of different, distinct, visibly distinguishable, continuous, and extensible line elements (e.g., element 220, and/or the like) to at least one of expand or contract along one or more predetermined associated paths (e.g., path 222, and/or the like) in image area 207 to form one or more portions of the line drawing, and/or the like.

Figure 2E:
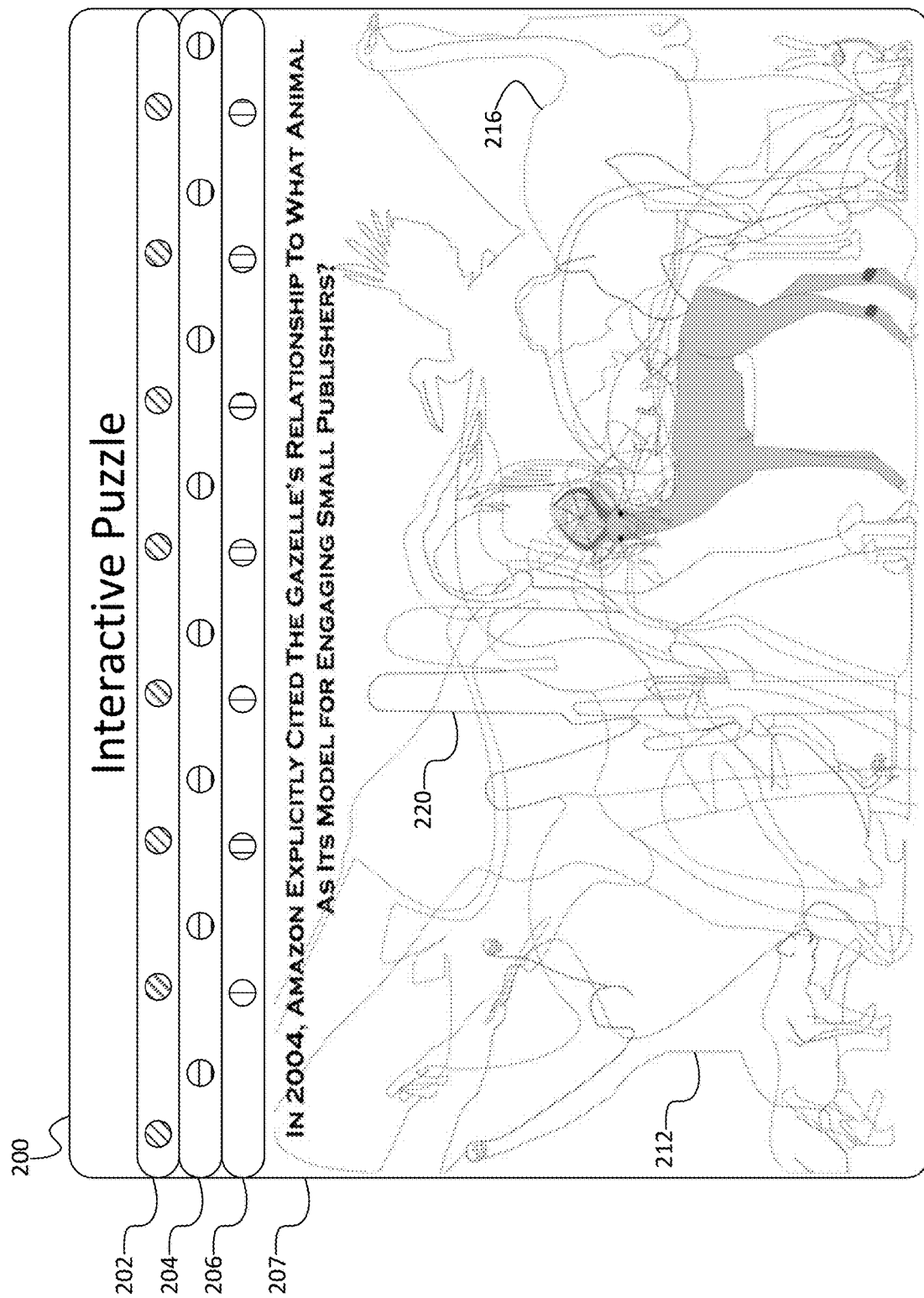

Referring to FIG. 2E, image area 207 may depict elements 212, 216, 220, and/or the like (e.g., expanded to their full extent, and/or the like).

Figure 2F:
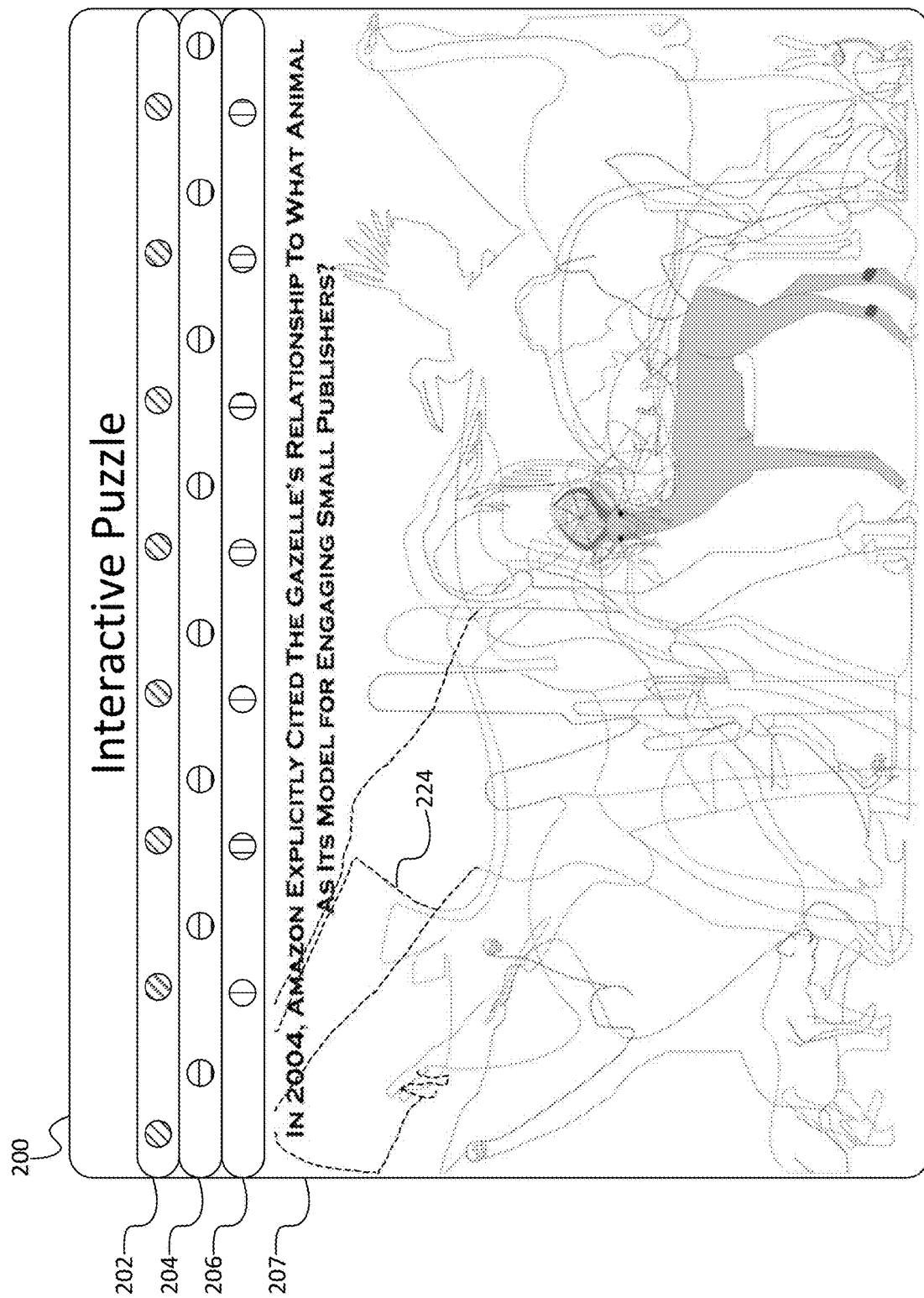

Referring to FIG. 2F, computing device(s) 10, and/or the like may receive user input selecting one or more portions 224 of the plurality of different, distinct, visibly distinguishable, continuous, and extensible line elements depicted by image area 207 and configuring portion(s) 224 to be removed from within image area 207, fail to be displayed within image area 207, have their prominence or appearance reduced and/or altered within image area 207 (e.g., such that image area 207 more prominently depicts at least a portion of the line drawing comprising at least a humanly discernible portion of at least one image that constitutes the at least a portion of the solution to the user-solvable puzzle, and/or the like). In some embodiments, portion(s) 224 may comprise at least one or more portions of a common (e.g., the same, and/or the like) line element from amongst the plurality of different, distinct, visibly distinguishable, continuous, and extensible line elements, and/or the like. Additionally or alternatively, portion(s) 224 may comprises at least one or more portions of different and distinct line elements from amongst the plurality of different, distinct, visibly distinguishable, continuous, and extensible line elements, and/or the like.

Figure 2G:
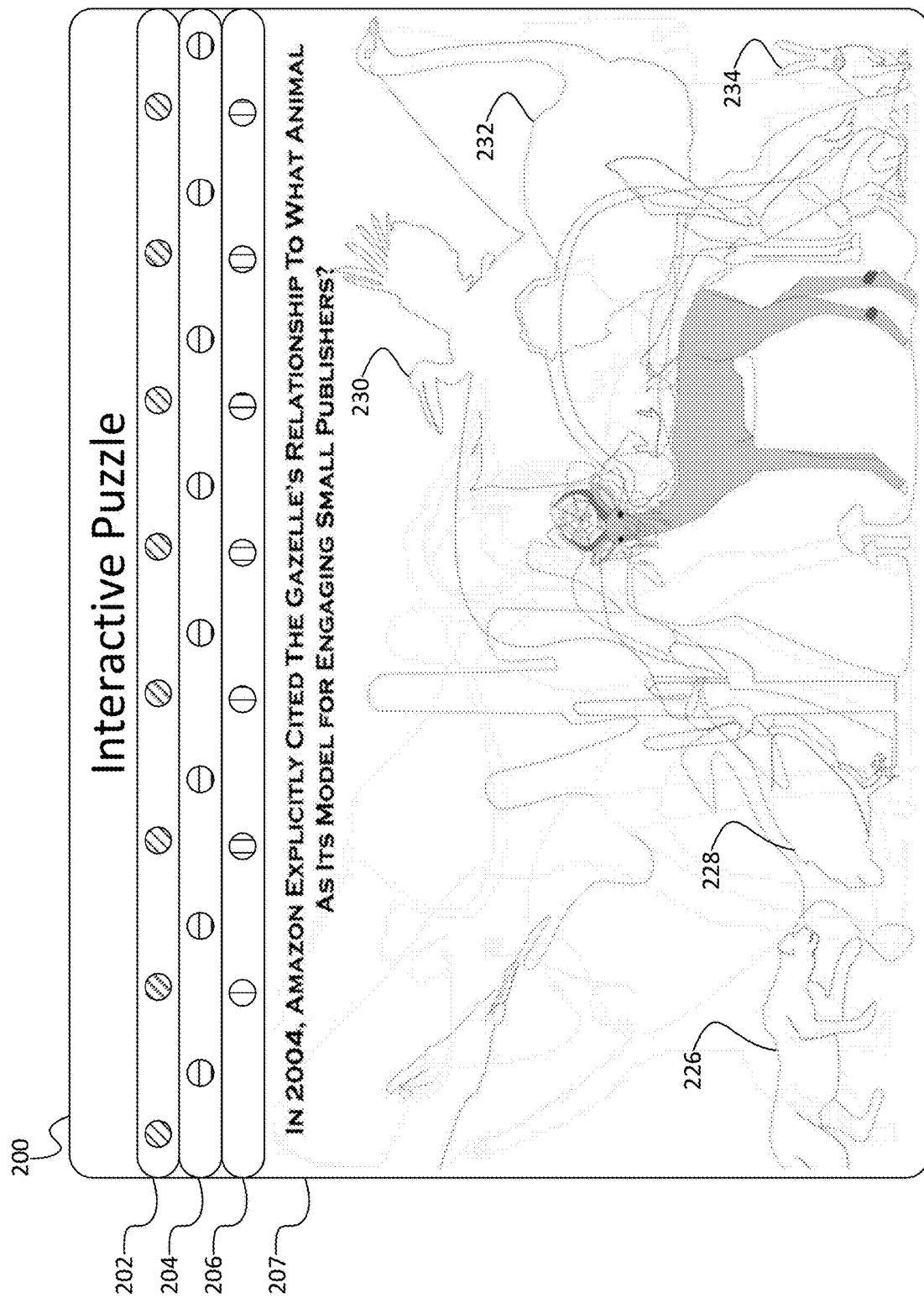
Figure 2H:
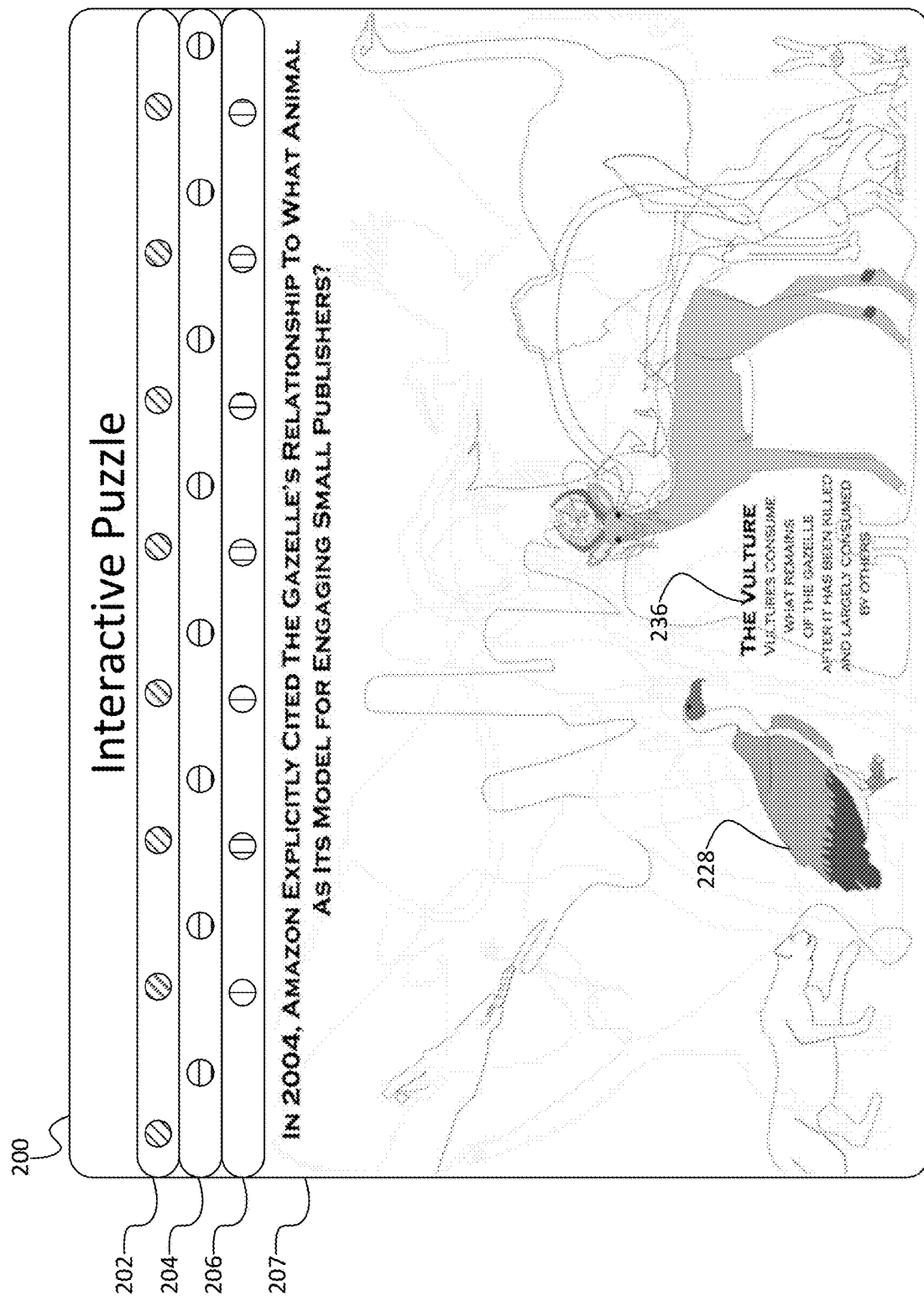
Figure 2I:
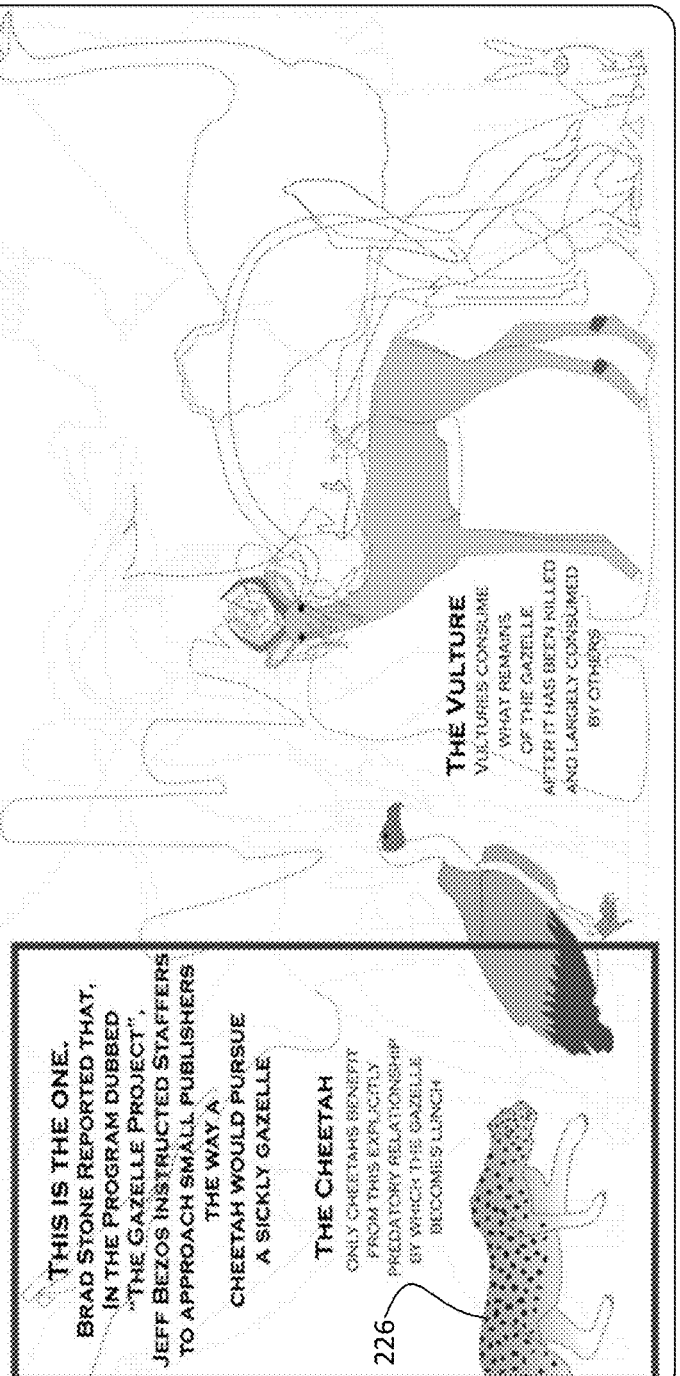
Figure 2J:
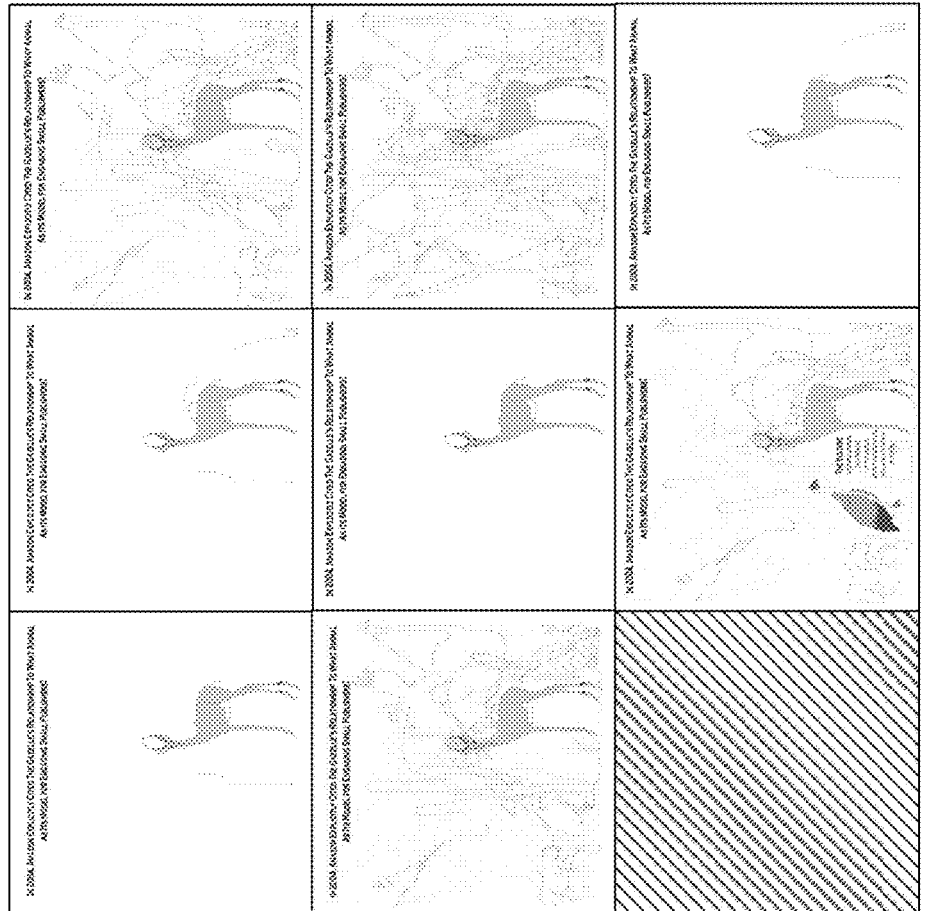

Referring to FIG. 2G, as portion(s) 224, and/or the like are removed from within image area 207, and/or the like, the plurality of different and distinct images 226, 228, 230, 232, 234, and/or the like (e.g., associated with the user-solvable puzzle, and/or the like) may become more discernable, apparent, and/or the like to the human user of computing device(s) 10, and/or the like. Similarly, referring to FIG. 2H, as additional portion(s) of the line drawing and/or the like are removed from within image area 207, and/or the like, one or more of the plurality of different and distinct images (e.g., image 228, and/or the like) may become more discernable, apparent, and/or the like to the human user of computing device(s) 10, and/or the like. For example, one or more portions of the line drawing (e.g., associated with image 228, and/or the like) may be filled with one or more patterns, textures, colors, and/or the like. In some embodiments, image area 207 may include one or more elements 236 (e.g., text, graphics, and/or the like) regarding image 228, and/or the like. Further, referring to FIG. 2I, as additional portion(s) of the line drawing and/or the like are removed from within image area 207, and/or the like, one or more of the plurality of different and distinct images (e.g., image 226, and/or the like) may become more discernable, apparent, and/or the like to the human user of computing device(s) 10, and/or the like. For example, one or more portions of the line drawing (e.g., associated with image 226, and/or the like) may be filled with one or more patterns, textures, colors, and/or the like. In some embodiments, image area 207 may include one or more elements 238 (e.g., text, graphics, and/or the like) regarding image 226, and/or the like.

In some embodiments, the user-solvable puzzle associated with the plurality of different and distinct images may comprise a different and distinct puzzle, and/or the like. For example, referring to FIG. 2J, image area 207 may comprise gridlock puzzle 240, which may include at least one empty space and multiple different tiles, each of which may depict a different and distinct image of the one or more of the plurality of different, distinct, visibly distinguishable, continuous, and extensible line elements at least one of expanded or contracted along their one or more predetermined associated paths in the image area to form the line drawing comprising at least the humanly discernible portion of the at least one image that constitutes the at least a portion of the solution to the user-solvable puzzle (e.g., for the user to rearrange in chronological order, and/or the like).

Figure 3B:
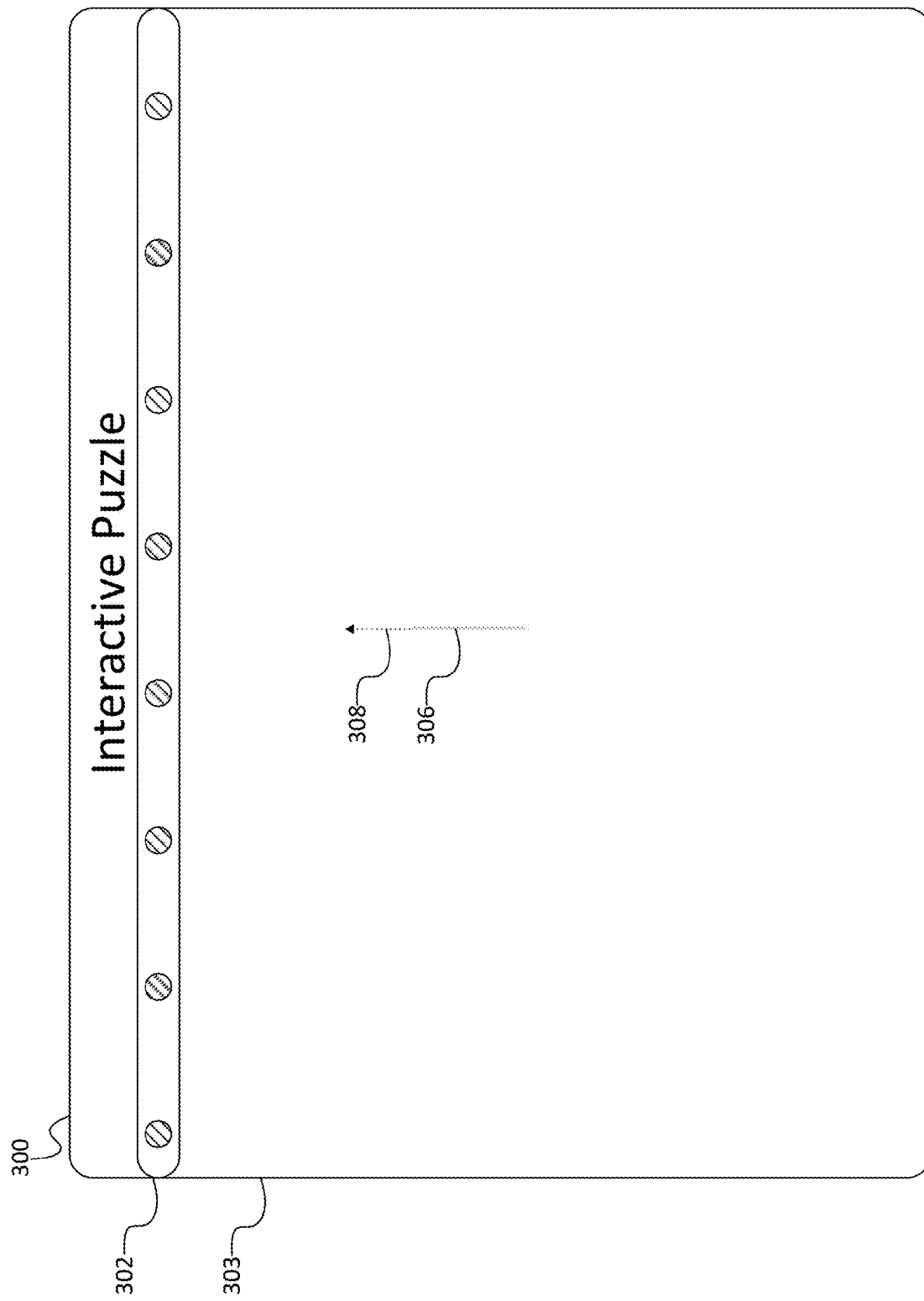
FIGS. 3A-N depict additional example interfaces according to example embodiments of the present disclosure.
Figure 3C:
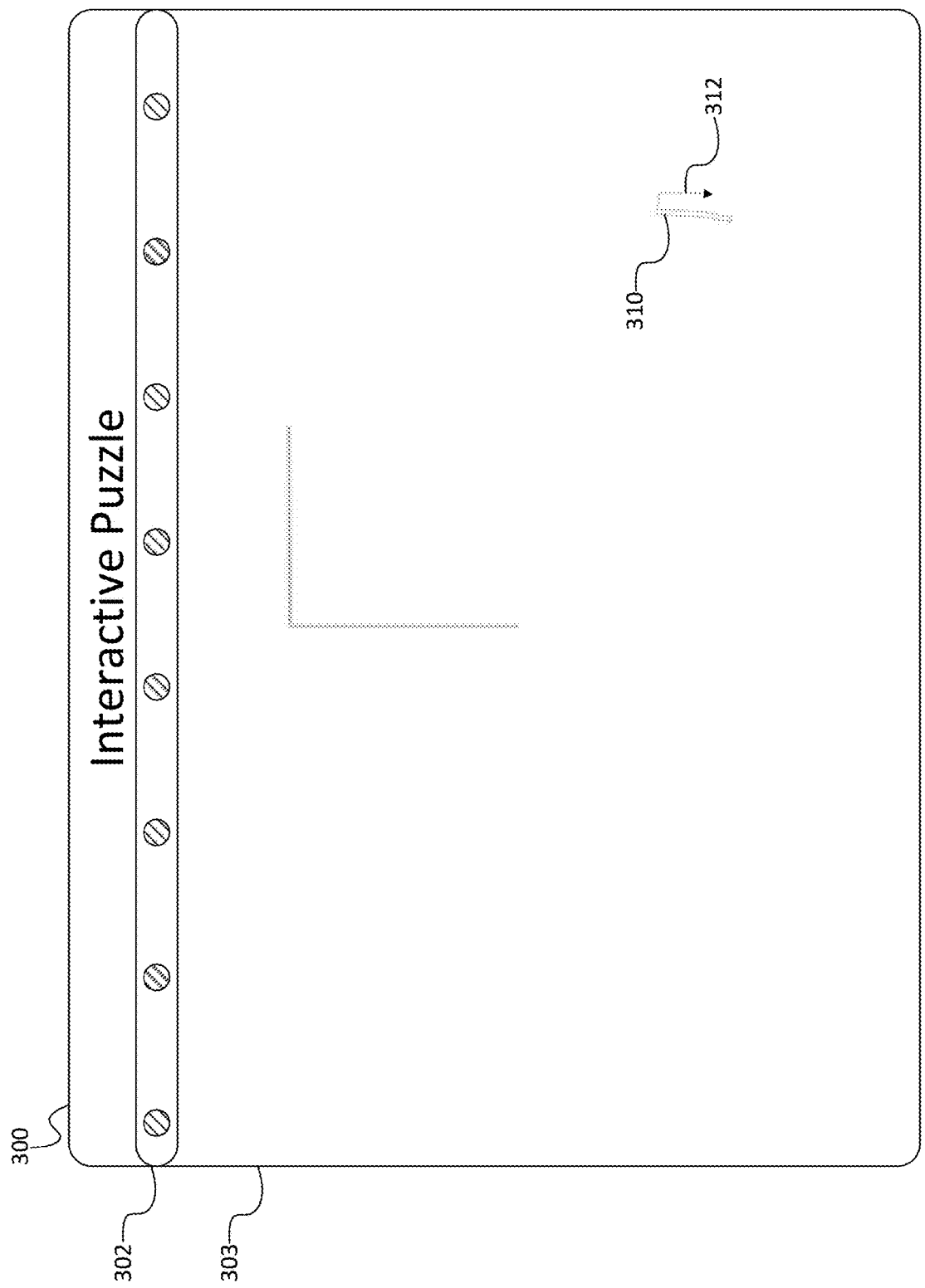
Figure 3D:
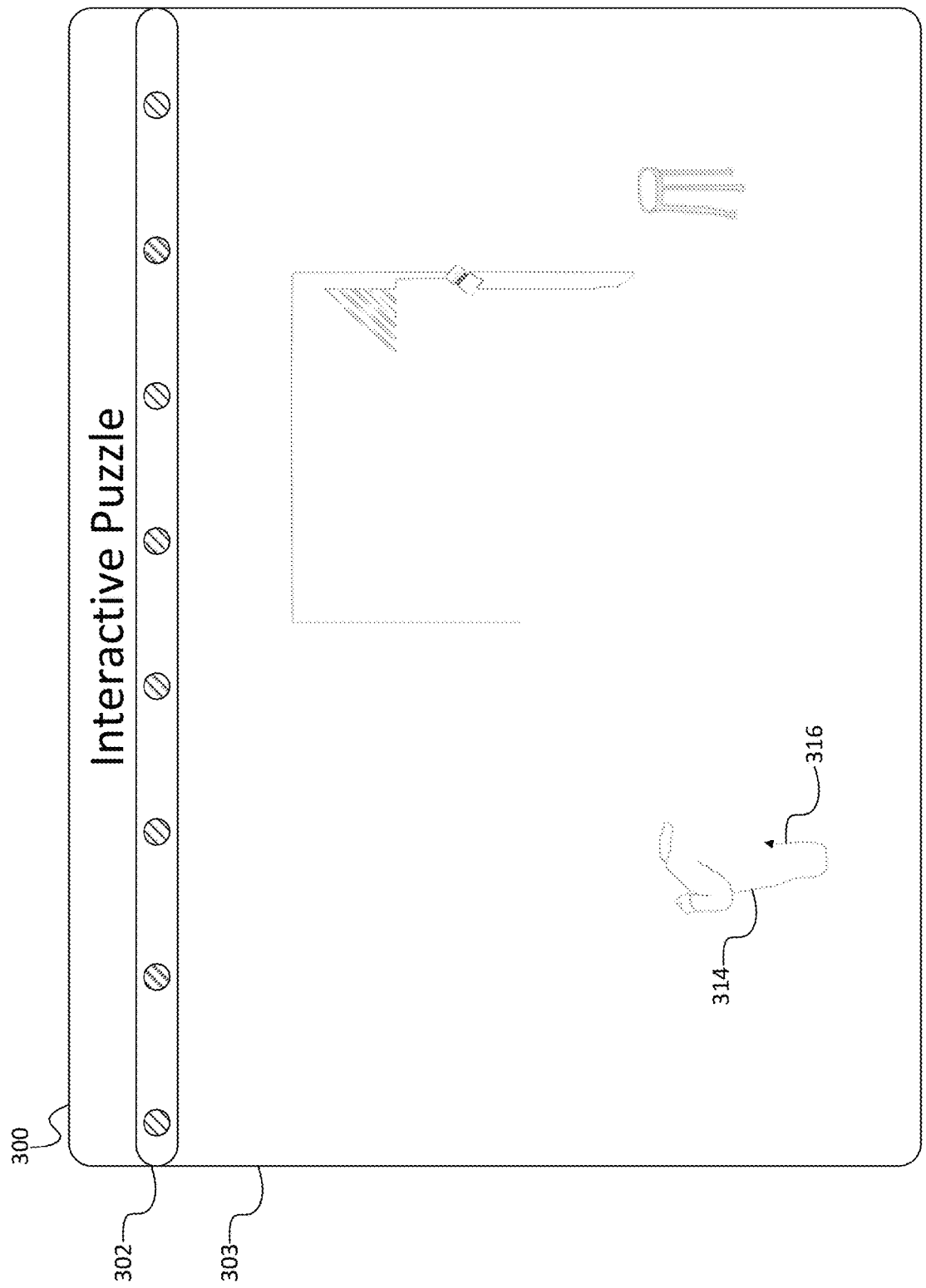
Figure 3E:
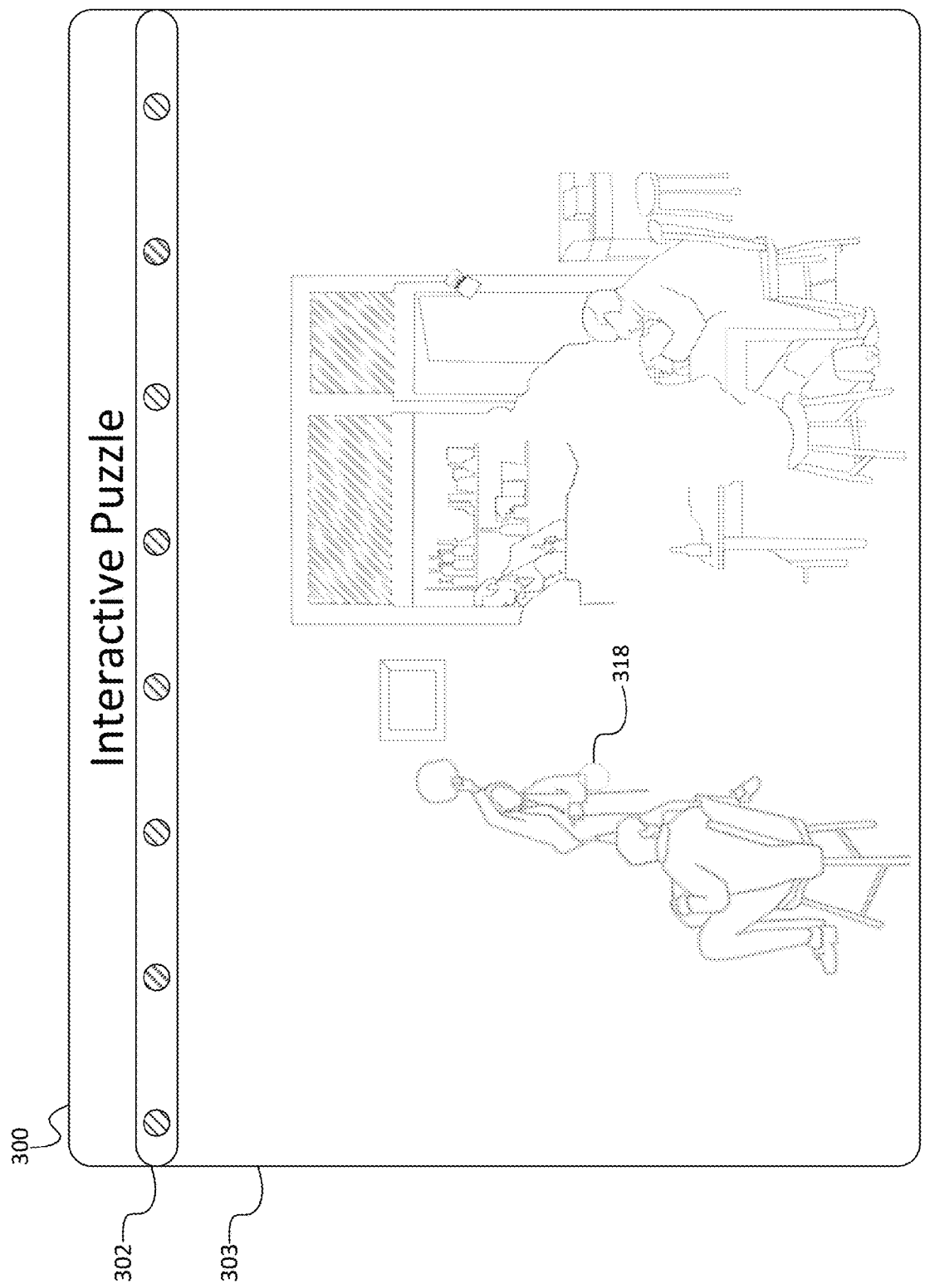
Figure 3F:
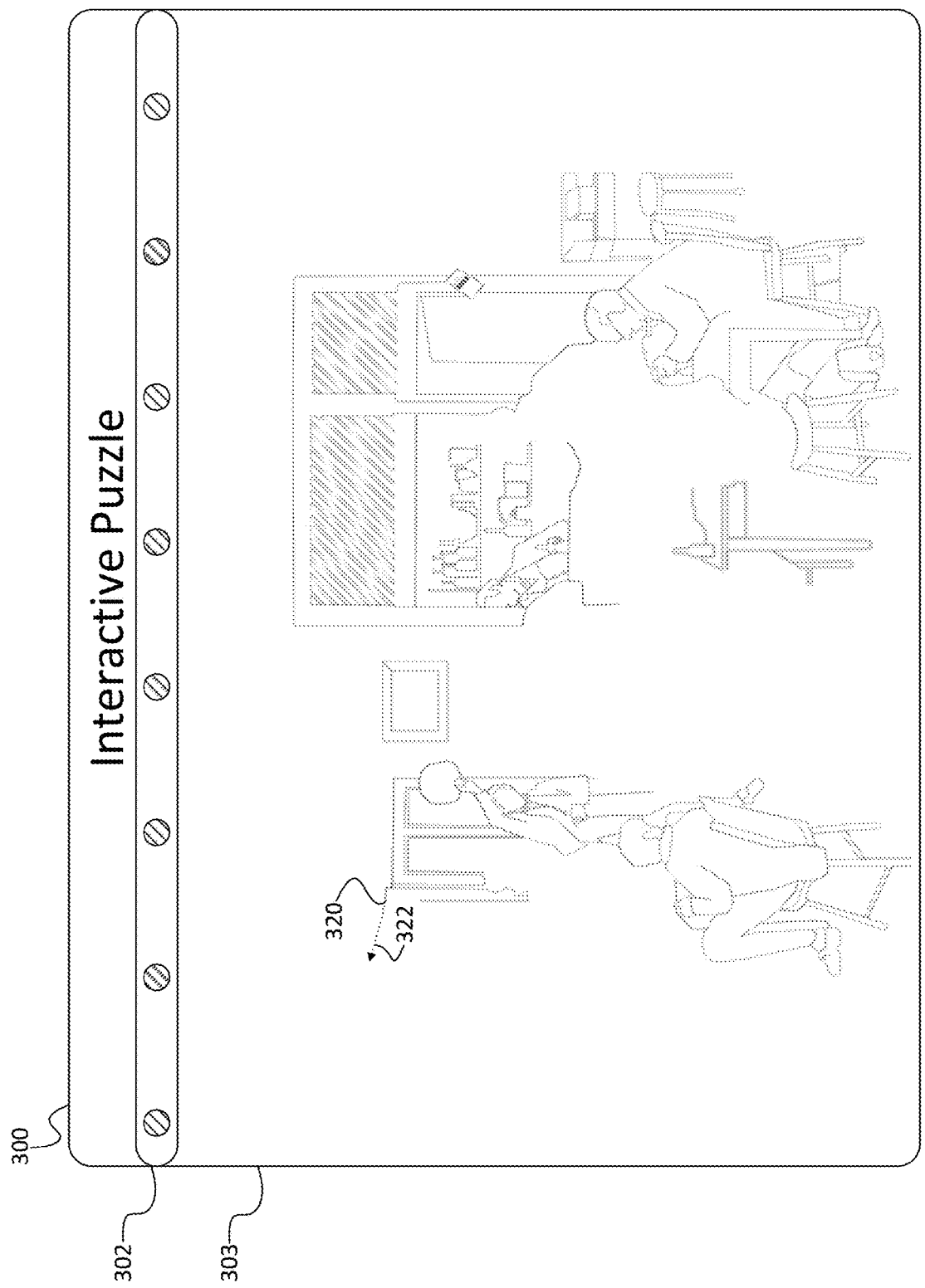
Figure 3G:
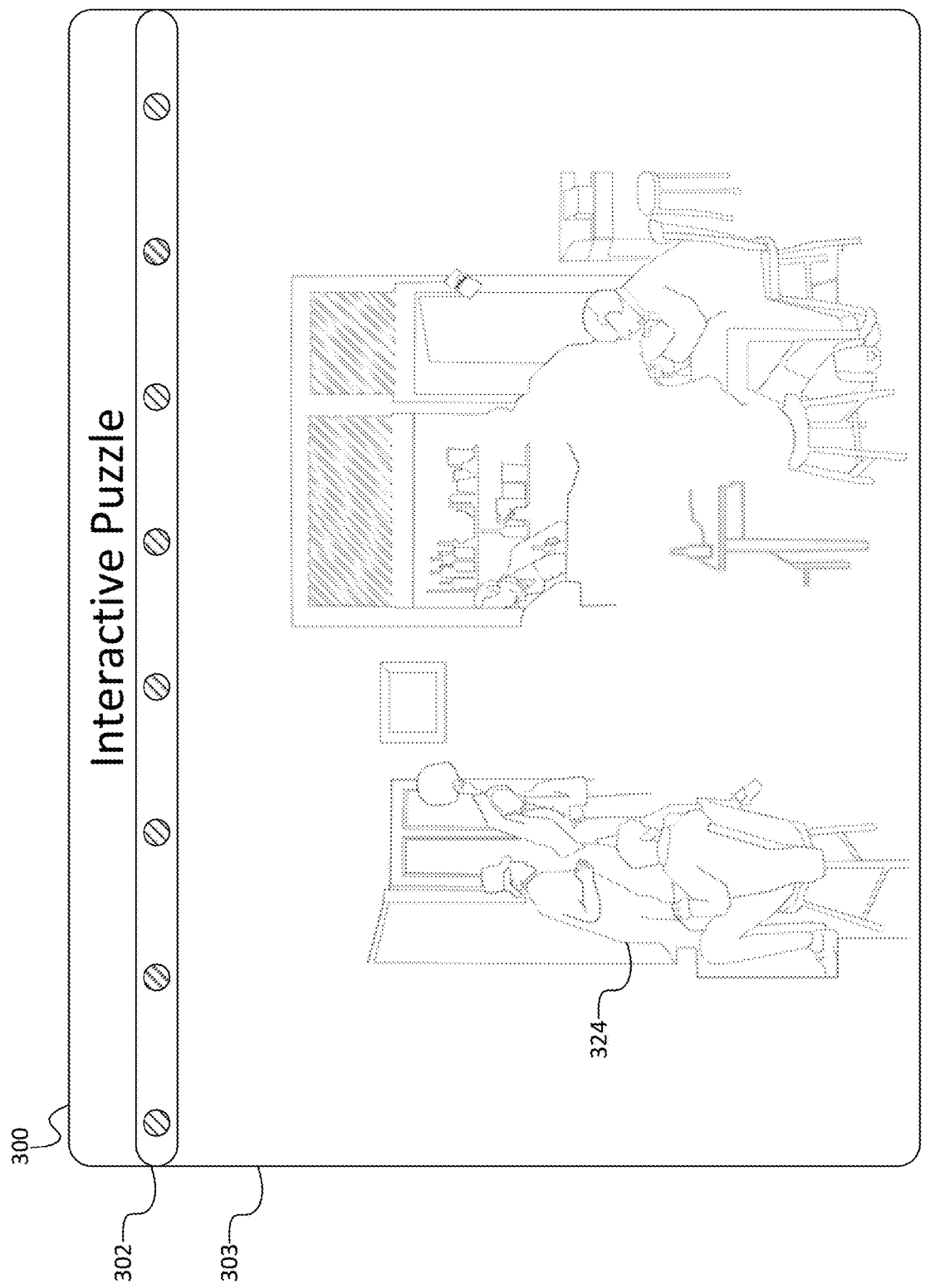
Figure 3H:
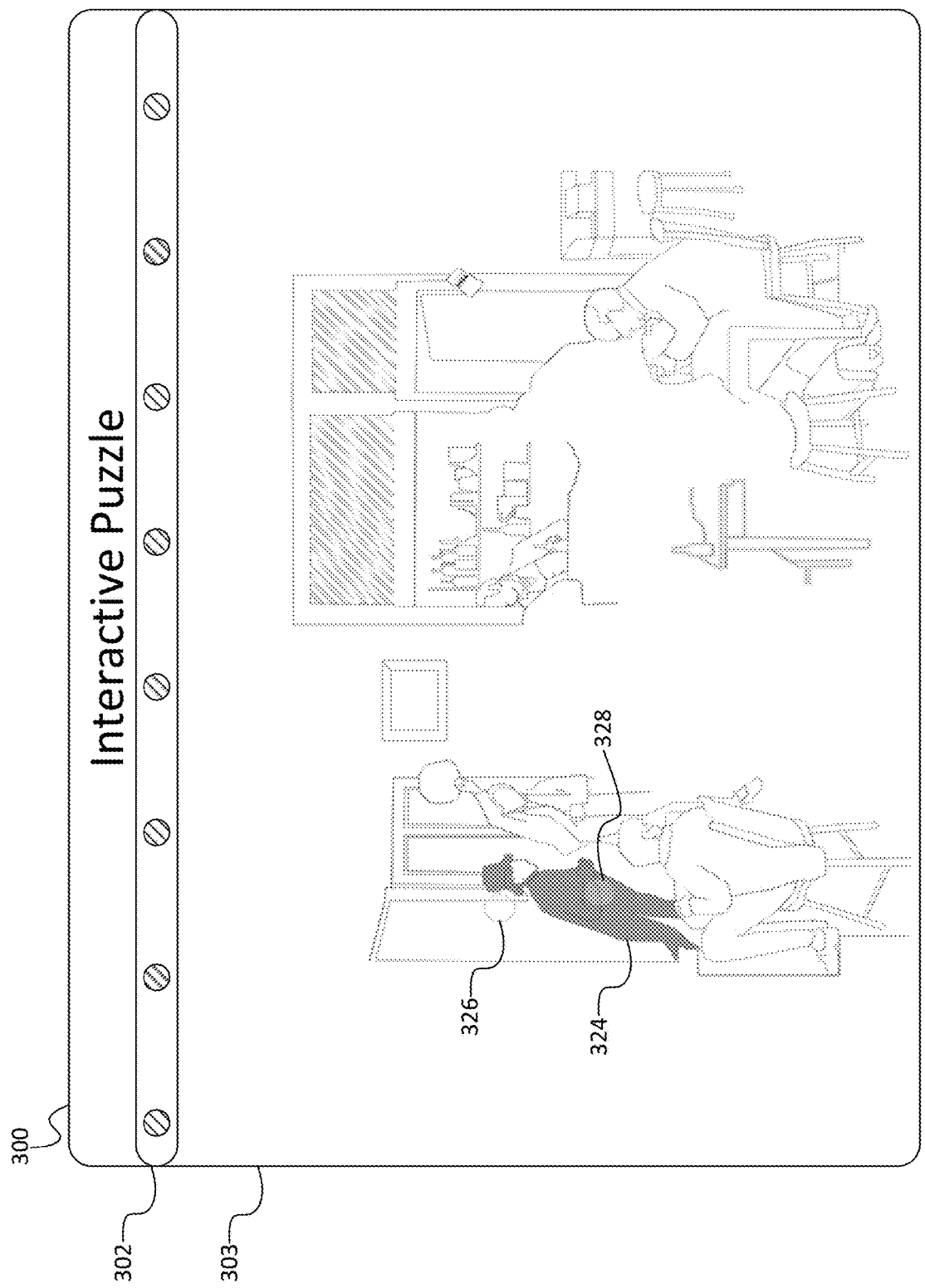
Figure 3I:
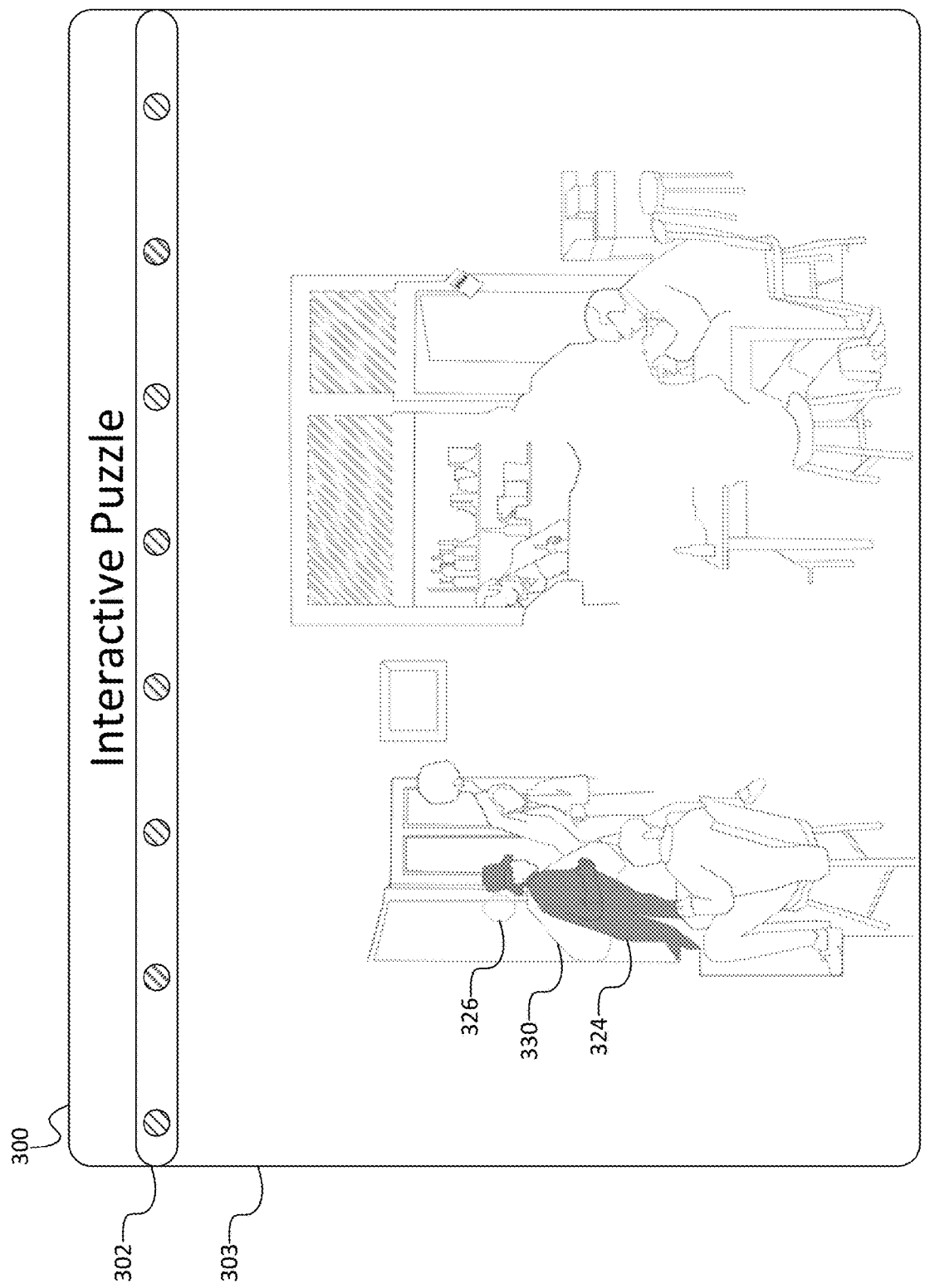
Figure 3J:
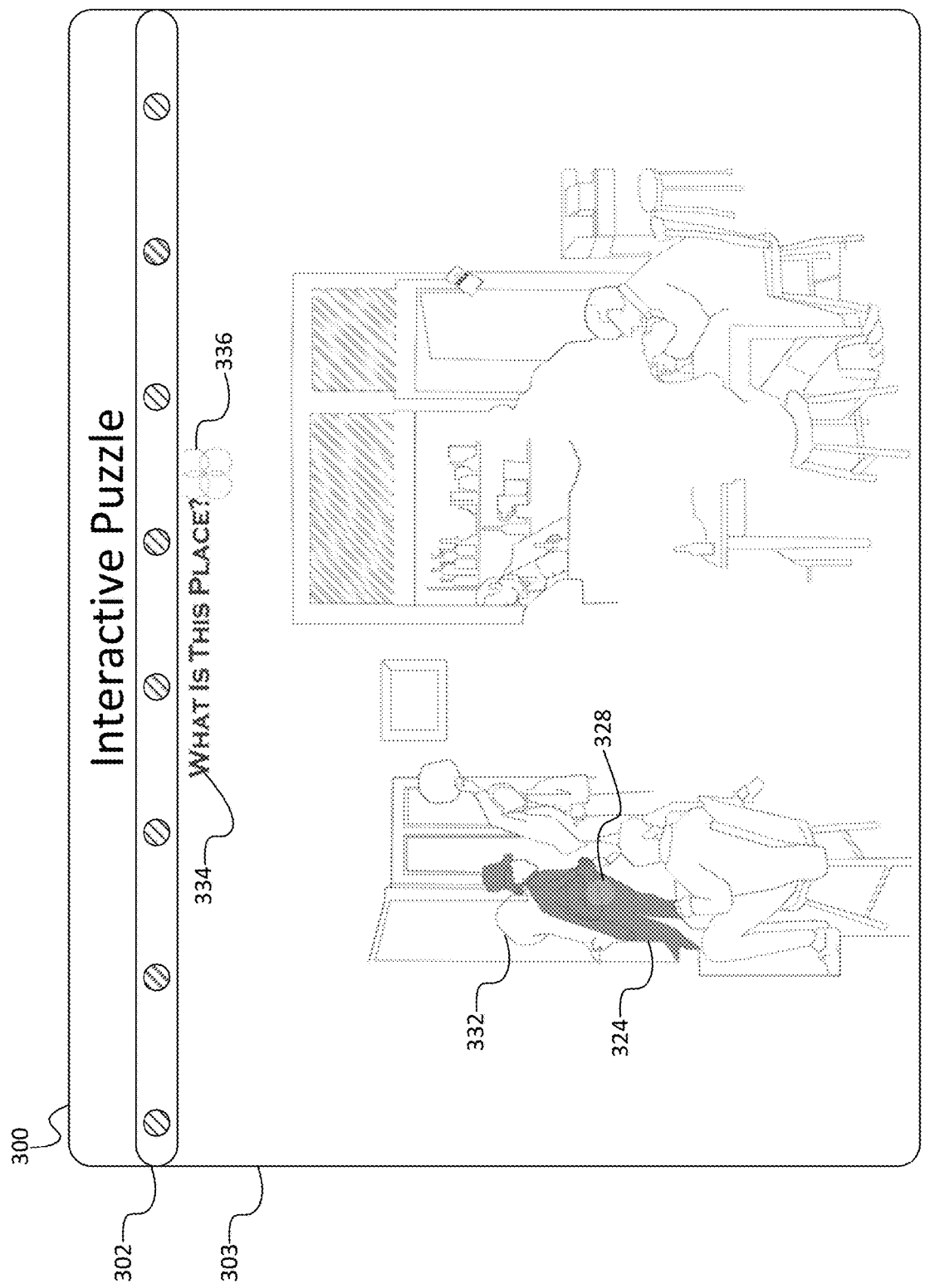
Figure 3K:
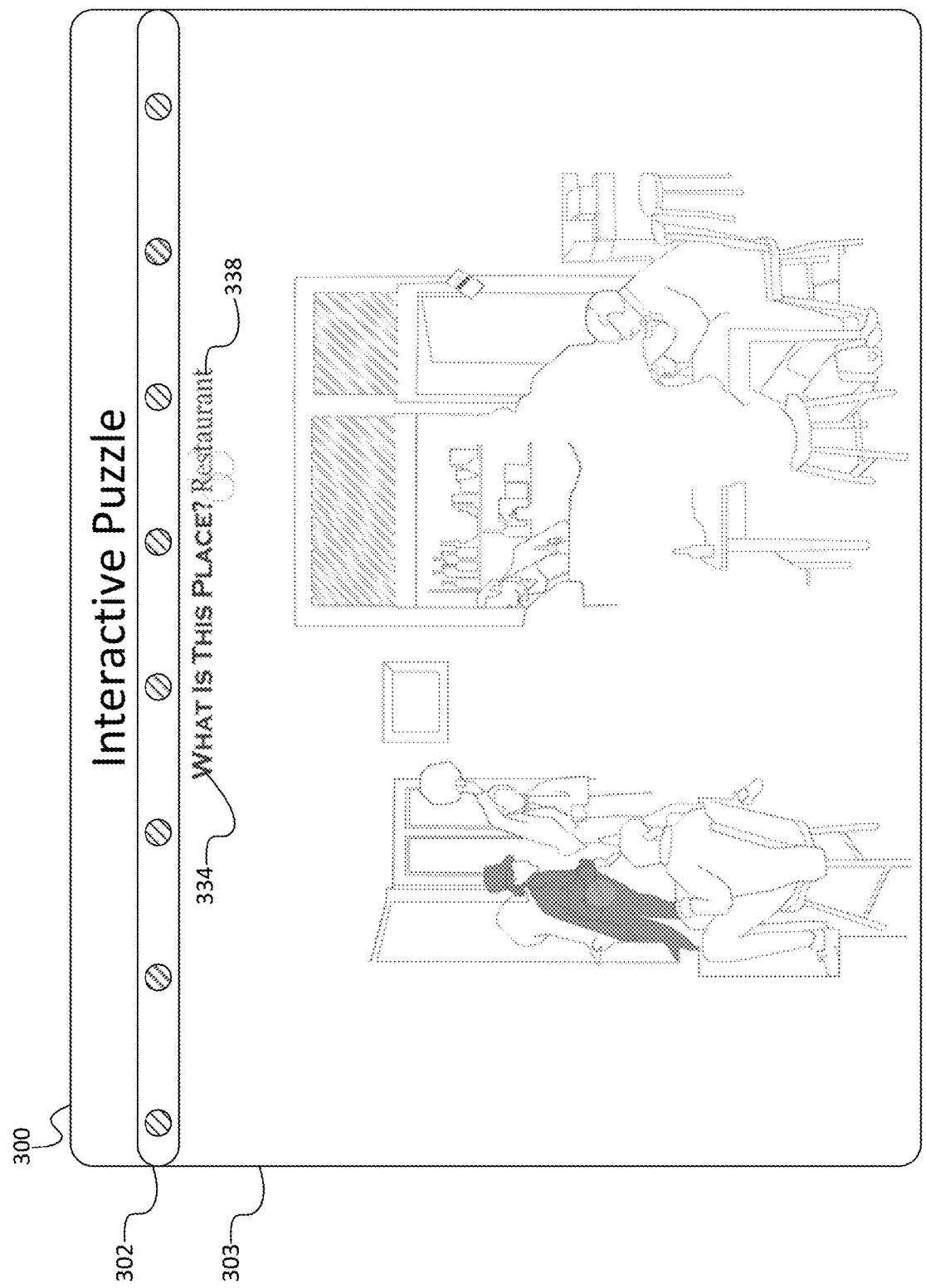
Figure 3L:
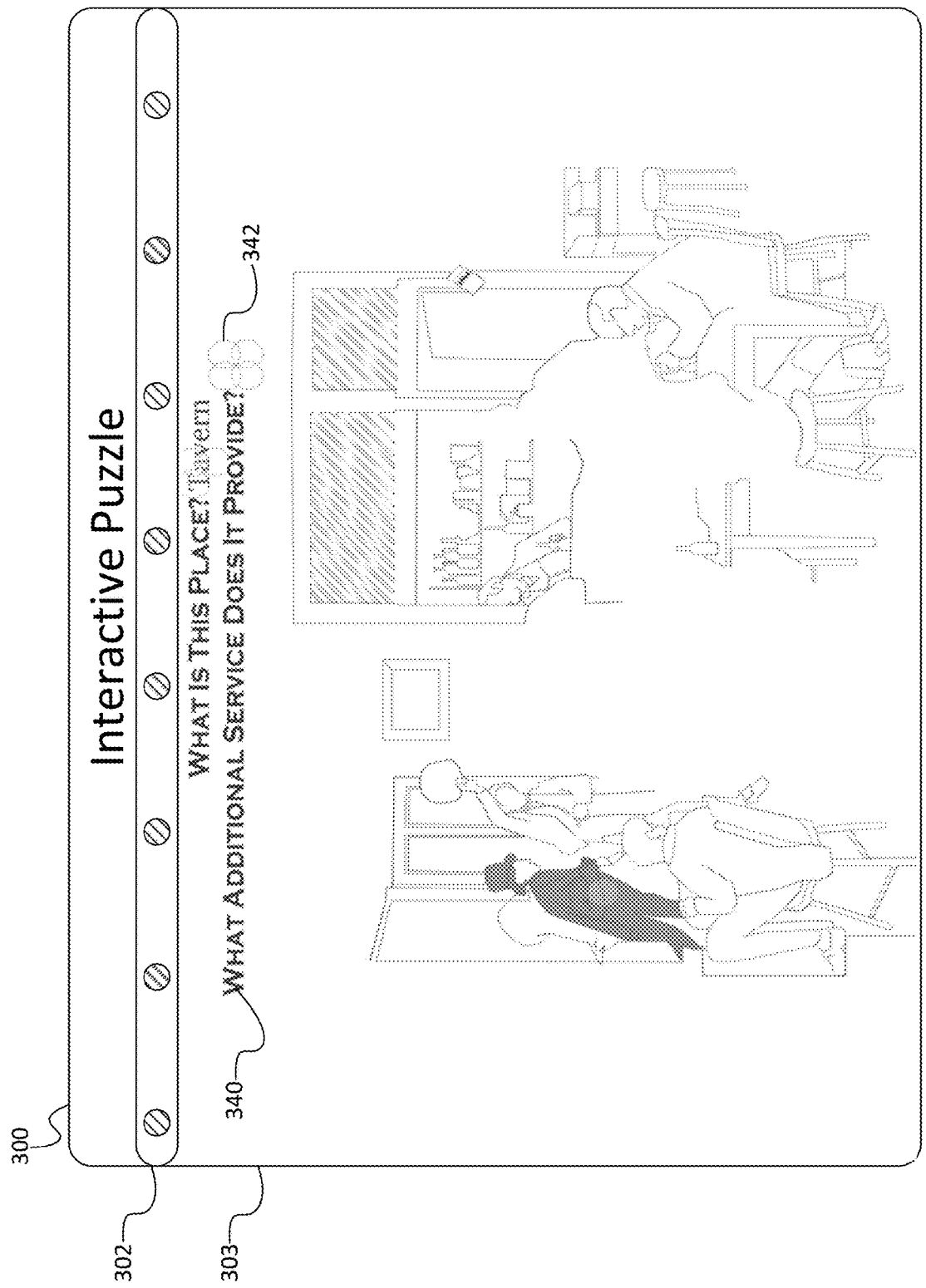
Figure 3M:
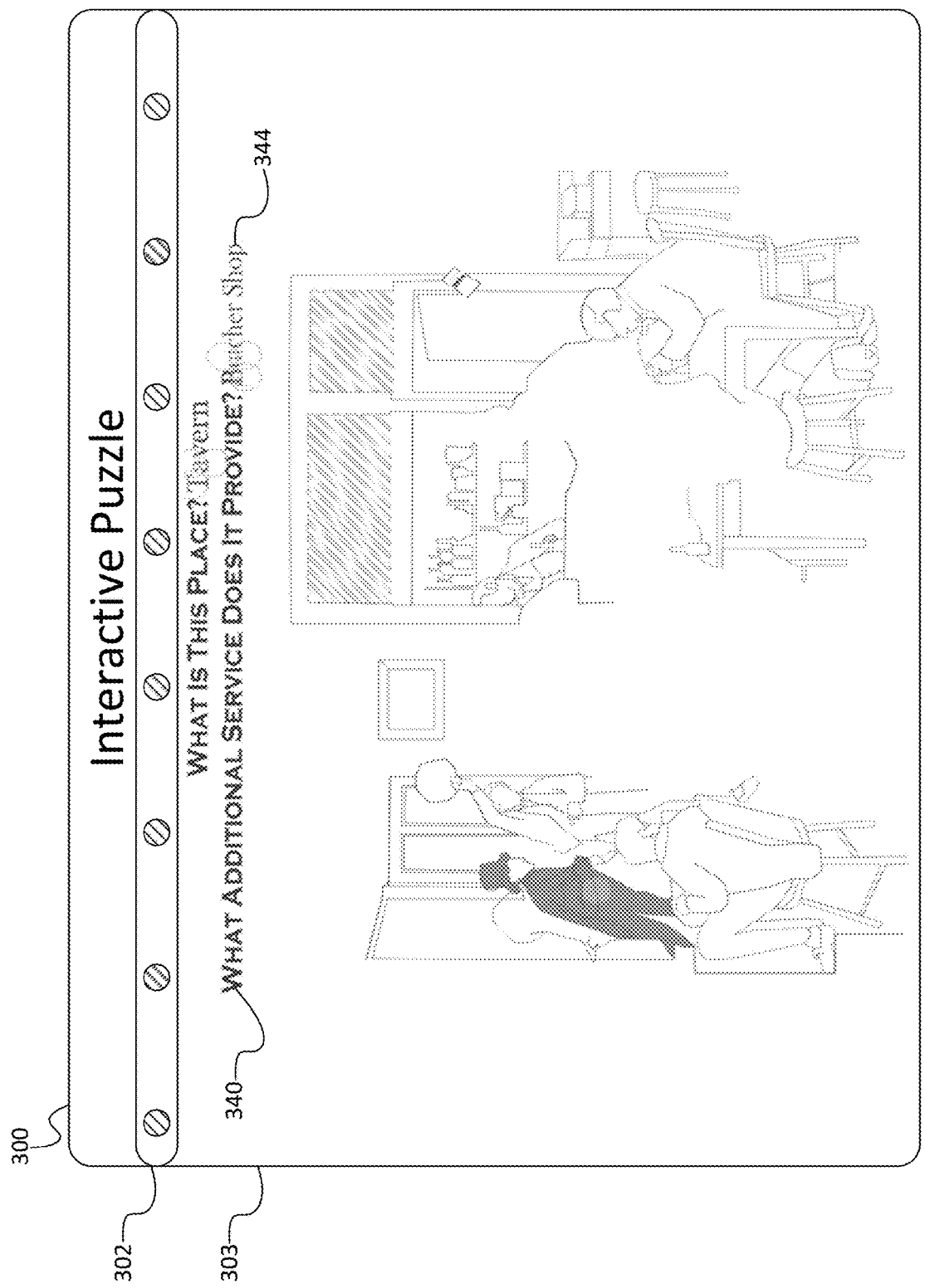
Figure 3N:
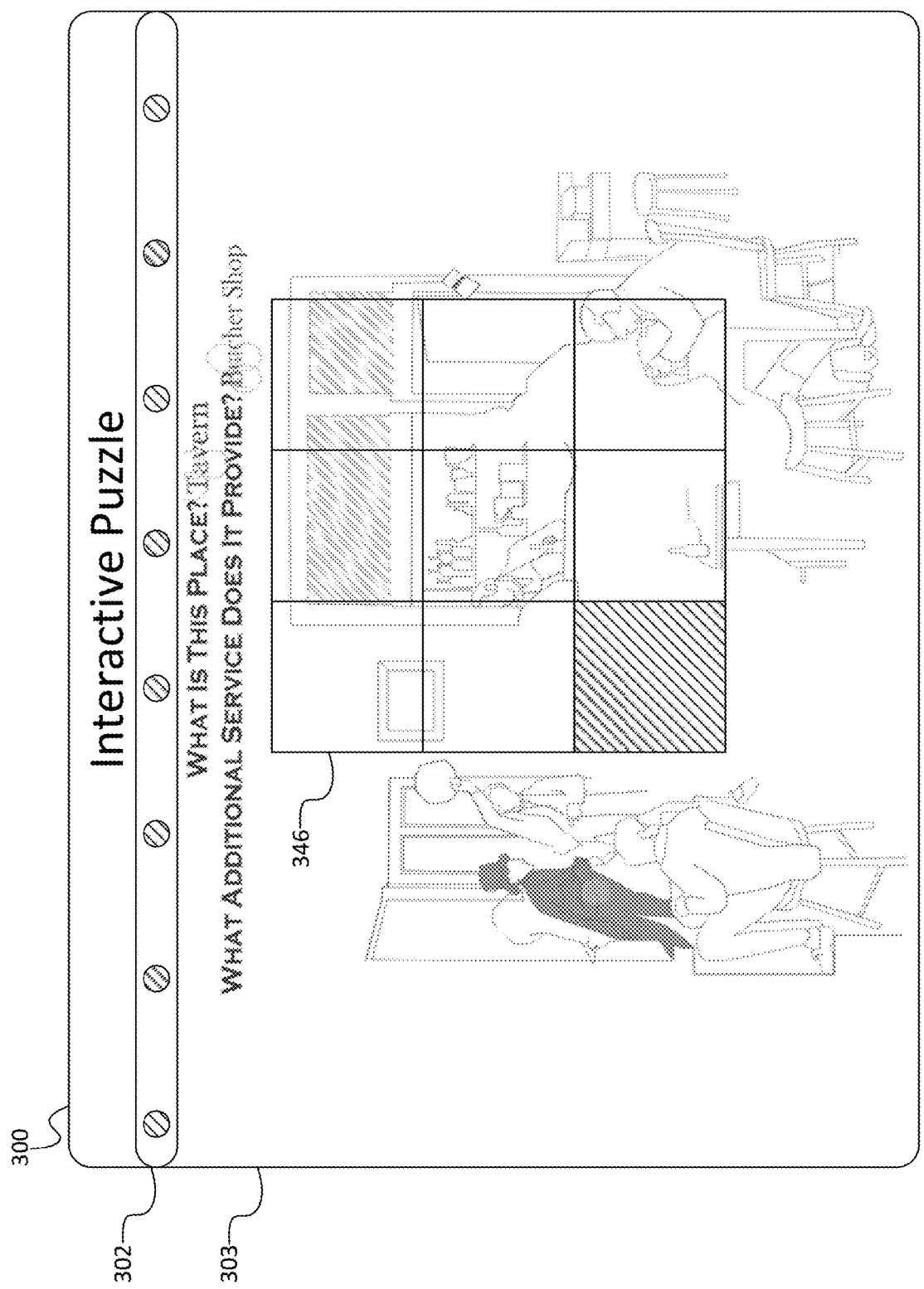

FIGS. 3A-N depict example interfaces according to example embodiments of the present disclosure.

For example, referring to FIG. 3A, computing device(s) 10 (e.g., one or more user devices, and/or the like) and/or (e.g., via network(s) 102, 104, and/or the like) computing device(s) 50 (e.g., one or more servers, and/or the like) may generate, communicate, and/or the like data representing GUI 300, and/or the like, which computing device(s) 10 may (e.g., based at least in part on such data, and/or the like) render, display, provide to a user, and/or the like. As illustrated, GUI 300 may comprise (e.g., visibly, invisibly, as one or more displayed and/or un-displayed aspects of one or more touch controls, and/or the like) user-manipulable control element 302, and/or the like. GUI 300 may also comprise image area 303, which may be configured to render, display, provide to a user, and/or the like a plurality of different and distinct images (e.g., associated with a user-solvable puzzle, and/or the like). In some embodiments, image area 303 may include at least one user-invokable element 304 for selecting at least one of one or more of a plurality of different, distinct, visibly distinguishable, continuous, and extensible line elements for control via control element 302, and/or the like.

Referring to FIG. 3B, control element 302 may be configured to (e.g., responsive to receiving corresponding user input via element(s) 302, 304, and/or the like) cause one or more of the plurality of different, distinct, visibly distinguishable, continuous, and extensible line elements (e.g., element 306, and/or the like) to at least one of expand or contract along one or more predetermined associated paths (e.g., path 308, and/or the like) in image area 303 to form one or more portions of a line drawing, and/or the like. Similarly, referring to FIG. 3C, control element 302 may be configured to (e.g., responsive to receiving corresponding user input via element(s) 302, 304, and/or the like) cause one or more of the plurality of different, distinct, visibly distinguishable, continuous, and extensible line elements (e.g., element 310, and/or the like) to at least one of expand or contract along one or more predetermined associated paths (e.g., path 312, and/or the like) in image area 303 to form one or more portions of the line drawing, and/or the like; and referring to FIG. 3D, control element 302 may be configured to (e.g., responsive to receiving corresponding user input via element(s) 302, 304, and/or the like) cause one or more of the plurality of different, distinct, visibly distinguishable, continuous, and extensible line elements (e.g., element 314, and/or the like) to at least one of expand or contract along one or more predetermined associated paths (e.g., path 316, and/or the like) in image area 303 to form one or more portions of the line drawing, and/or the like.

Referring to FIG. 3E, as previously indicated, in some embodiments, image area 303 may include at least one user-invokable element 318 for selecting at least one of one or more of the plurality of different, distinct, visibly distinguishable, continuous, and extensible line elements for control via control element 302, and/or the like. Referring to FIG. 3F, control element 302 may be configured to (e.g., responsive to receiving corresponding user input via element(s) 302, 318, and/or the like) cause one or more of the plurality of different, distinct, visibly distinguishable, continuous, and extensible line elements (e.g., element 320, and/or the like) to at least one of expand or contract along one or more predetermined associated paths (e.g., path 322, and/or the like) in image area 303 to form one or more portions of the line drawing, and/or the like.

Referring to FIG. 3G, as one or more of the plurality of different, distinct, visibly distinguishable, continuous, and extensible line elements expand and/or contract along their predetermined associated paths in image area 303 to form one or more portions of the line drawing, and/or the like, one or more of the plurality of different and distinct images (e.g., image 324, and/or the like) may become more discernable, apparent, and/or the like to the human user of computing device(s) 10, and/or the like. For example, referring to FIG. 3H, one or more portions of the line drawing (e.g., associated with image 324, and/or the like) may be filled with one or more patterns, textures, colors, and/or the like.

As previously indicated, in some embodiments, image area 303 may include one or more user-invokable elements 326, 328, and/or the like for selecting at least one of one or more of the plurality of different, distinct, visibly distinguishable, continuous, and extensible line elements for control via control element 302, and/or the like. In some of such embodiments, each of such corresponding different and distinct line elements may be associated with one or more of a plurality of different, distinct, alternative, and/or the like narratives, stories, themes, scenes, and/or the like (e.g., associated with the user-solvable puzzle, and/or the like). In some embodiments, such narratives, stories, themes, scenes, and/or the like may occur over different periods of time (e.g., relating to the same or associated characters, objects, scenes, and/or the like). Additionally or alternatively, such narratives, stories, themes, scenes, and/or the like may relate differences between how one or more individual characters see themselves, their stories, and/or the like (e.g., versus self-narratives, images, and/or the like). In some embodiments, the user (e.g., acting akin to a puppeteer, and/or the like) may twist, alter, and/or the like one or more portions of the line drawing(s), image(s), and/or the like into a structure, text element, and/or the like (e.g., associated with the solution to the user-solvable puzzle, and/or the like). Additionally or alternatively, one or more portions of the line drawing(s), image(s), and/or the like may include figures that may (e.g., notionally, and/or the like) create, cast, and/or the like shadows that include one or more hidden messages, and/or the like. In some embodiments, one or more portions of the line drawing(s), image(s), and/or the like may cast light, shadow, and/or the like that reveals previously hidden content, lines, behavior, and/or the like.

For example, referring to FIG. 3I, control element 302 may be configured to (e.g., responsive to receiving corresponding user input via element(s) 302, 328, and/or the like) cause one or more of the plurality of different, distinct, visibly distinguishable, continuous, and extensible line elements (e.g., element 330, and/or the like) to at least one of expand or contract along one or more predetermined associated paths in image area 303 to form one or more portions of the line drawing, and/or the like. Similarly, referring to FIG. 3J, control element 302 may be configured to (e.g., responsive to receiving corresponding user input via element(s) 302, 326, and/or the like) cause one or more of the plurality of different, distinct, visibly distinguishable, continuous, and extensible line elements (e.g., element 332, and/or the like) to at least one of expand or contract along one or more predetermined associated paths in image area 303 to form one or more portions of the line drawing, and/or the like.

In some embodiments, image area 303 may include one or more elements 334 (e.g., one or more text elements, graphics, and/or the like) posing a question, prompting a response, providing a clue, and/or the like, e.g., regarding at least one aspect of a solution to the user-solvable puzzle, and/or the like. In some of such embodiments, image area 303 may also include one or more different and distinct user-invokable elements 336, which may be configured to (e.g., responsive at least in part to user invocation, and/or the like) display within image area 303 one or more of multiple different and distinct responsive text segments, graphics, and/or the like (e.g., to the question, prompt, clue, and/or the like). For example, referring to FIG. 3K, image area 303 may include element(s) 338, and/or the like. Similarly, referring to FIG. 3L, image area 303 may include element(s) 340, 342, and/or the like; and referring to FIG. 3M, image area 303 may include element(s) 344, and/or the like.

As previously indicated, in some embodiments, the user-solvable puzzle associated with the plurality of different and distinct images may comprise a different and distinct puzzle, and/or the like. For example, referring to FIG. 3N, image area 303 may comprise gridlock puzzle 346, which may include at least one empty space and multiple different tiles, each of which may include a different and distinct portion of the line drawing, and/or the like (e.g., for the user to rearrange to form a different and distinct drawing, image, and/or the like).

Figure 4:
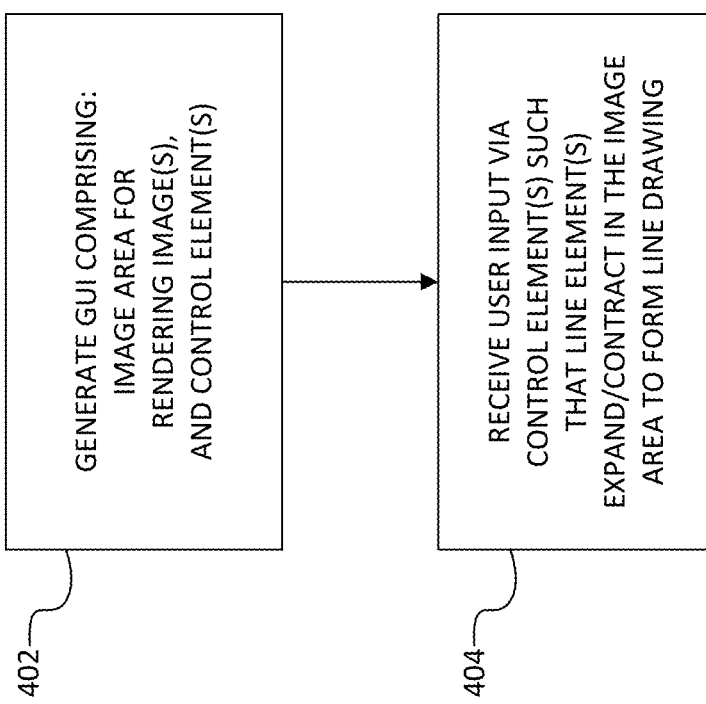
FIG. 4 depicts one or more example methods according to example embodiments of the present disclosure.

FIG. 4 depicts one or more example methods according to example embodiments of the present disclosure.

Referring to FIG. 4, at (402) one or more computing devices may generate data representing a GUI. The GUI may include an image area for rendering a plurality of different and distinct images including at least one image that constitutes at least a portion of a solution to a user-solvable puzzle associated with the plurality of different and distinct images. The GUI may also include one or more user-manipulable control elements configured to cause one or more of a plurality of different, distinct, visibly distinguishable, continuous, and extensible line elements to at least one of expand or contract along one or more predetermined associated paths in the image area to form a line drawing comprising at least a humanly discernible portion of the at least one image that constitutes the at least a portion of the solution to the user-solvable puzzle associated with the plurality of different and distinct images. For example, computing device(s) 10, 50, and/or the like may generate data representing GUI(s) 200, 300, and/or the like.

At (404), the computing device(s) may receive user input via the user-manipulable control element(s) such that the one or more of the plurality of different, distinct, visibly distinguishable, continuous, and extensible line elements at least one of expand or contract along their predetermined associated path(s) in the image area to form the line drawing comprising at least the humanly discernible portion of the at least one image that constitutes the at least a portion of the solution to the user-solvable puzzle associated with the plurality of different and distinct images. For example, computing device(s) 10, 50, and/or the like may receive user input (e.g., via element(s) 202, 204, 206, 302, and/or the like) such that element(s) 212, 216, 220, 306, 310, 314, and/or the like expand and/or contract along path(s) 214, 218, 222, 308, 312, 316, and/or the like in image area(s) 207, 303, and/or the like to form one or more of the line drawings depicted therein, and/or the like.

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein may be implemented using a single device or component and/or multiple devices or components working in combination. Databases and/or applications may be implemented on a single system and/or distributed across multiple systems. Distributed components may operate sequentially and/or in parallel.

Various connections between elements are discussed in the above description. These connections are general and, unless specified otherwise, may be direct and/or indirect, wired and/or wireless. In this respect, the specification is not intended to be limiting.

The depicted and/or described steps are merely illustrative and may be omitted, combined, and/or performed in an order other than that depicted and/or described; the numbering of depicted steps is merely for ease of reference and does not imply any particular ordering is necessary or preferred.

The functions and/or steps described herein may be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors of a computer and/or other data-processing device. The computer-executable instructions may be stored on a computer-readable medium such as a hard disk, optical disk, removable storage media, solid-state memory, read-only memory (ROM), random-access memory (RAM), or the like. As will be appreciated, the functionality of such instructions may be combined and/or distributed as desired. In addition, the functionality may be embodied in whole or in part in firmware and/or hardware equivalents, such as integrated circuits, application-specific integrated circuits (ASICs), field-programmable gate arrays (FPGAs), or the like. Particular data structures may be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein may be embodied as a method, system, apparatus, and/or one or more computer-readable media storing computer-executable instructions. Accordingly, aspects may take the form of an entirely hardware embodiment, an entirely software embodiment, an entirely firmware embodiment, and/or an embodiment combining software, hardware, and/or firmware aspects in any combination.

As described herein, the various methods and acts may be operative across one or more computing devices and/or networks. The functionality may be distributed in any manner or may be located in a single computing device (e.g., server, client computer, user device, or the like).

Aspects of the disclosure have been described in terms of illustrative embodiments thereof. Numerous other embodiments, modifications, and/or variations within the scope and spirit of the appended claims may occur to persons of ordinary skill in the art from a review of this disclosure. For example, one of ordinary skill in the art may appreciate that the steps depicted and/or described may be performed in other than the recited order and/or that one or more illustrated steps may be optional and/or combined. Any and all features in the following claims may be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment may be used with another embodiment to yield a still further embodiment. Thus, it is intended that the present disclosure cover such alterations, variations, and/or equivalents.

What is claimed is:

1. A method comprising:
    generating and displaying, by one or more computing devices comprising at least one processor and memory, a graphical user interface (GUI) comprising:
        an image area for rendering a plurality of different and distinct images including at least one image that constitutes at least a portion of a solution to a user-solvable puzzle associated with the plurality of different and distinct images, and
        one or more user-manipulable control elements configured to cause one or more of a plurality of different, distinct, visibly distinguishable, continuous, and extensible line elements to expand and contract along one or more predetermined associated paths in the image area to form a line drawing comprising at least a humanly discernible portion of the at least one image that constitutes the at least a portion of the solution to the user-solvable puzzle associated with the plurality of different and distinct images, wherein each of the plurality of different, distinct, visibly distinguishable, continuous, and extensible line elements is associated with a different, distinct, and alternative narrative, story, theme, or scene associated with the user-solvable puzzle;
    receiving, by the one or more computing devices comprising the at least one processor and memory, user input via the one or more user-manipulable control elements such that the one or more of the plurality of different, distinct, visibly distinguishable, continuous, and extensible line elements expand and contract along their one or more predetermined associated paths in the image area to form the line drawing comprising at least the humanly discernible portion of the at least one image that constitutes the at least a portion of the solution to the user-solvable puzzle associated with the plurality of different and distinct images; and
    displaying in the image area, by the one or more computing devices comprising the at least one processor and memory, the line drawing comprising at least the humanly discernible portion of the at least one image that constitutes the at least a portion of the solution to the user-solvable puzzle associated with the plurality of different and distinct images.

2. The method of claim 1, wherein:
    the one or more user-manipulable control elements comprise at least one common control element configured to cause the one or more of the plurality of different, distinct, visibly distinguishable, continuous, and extensible line elements to expand and contract along their one or more predetermined associated paths in the image area to form at least a portion of the line drawing comprising at least the humanly discernible portion of the at least one image that constitutes the at least a portion of the solution to the user-solvable puzzle associated with the plurality of different and distinct images; and
    the method comprises receiving, by the one or more computing devices, user input via the at least one common control element such that the one or more of the plurality of different, distinct, visibly distinguishable, continuous, and extensible line elements expand and contract along their one or more predetermined associated paths in the image area to form the at least a portion of the line drawing comprising at least the humanly discernible portion of the at least one image that constitutes the at least a portion of the solution to the user-solvable puzzle associated with the plurality of different and distinct images.

3. The method of claim 2, wherein:
    the image area comprises at least one user-invokable element for selecting at least one of the one or more of the plurality of different, distinct, visibly distinguishable, continuous, and extensible line elements for control via the at least one common control element; and
    the method comprises receiving, by the one or more computing devices, user input via:
        the at least one user-invokable element selecting the at least one of the one or more of the plurality of different, distinct, visibly distinguishable, continuous, and extensible line elements for control via the at least one common control element, and the at least one common control element such that the at least one of the one or more of the plurality of different, distinct, visibly distinguishable, continuous, and extensible line elements expands and contracts along its one or more predetermined associated paths in the image area to form the at least a portion of the line drawing comprising at least the humanly discernible portion of the at least one image that constitutes the at least a portion of the solution to the user-solvable puzzle associated with the plurality of different and distinct images.

4. The method of claim 3, wherein:

the image area comprises at least two different and distinct user-invokable elements, each of which is configured to select a corresponding different and distinct line element from amongst the one or more of the plurality of different, distinct, visibly distinguishable, continuous, and extensible line elements for control via the at least one common control element; and each corresponding different and distinct line element is associated with one or more of a plurality of different, distinct, and alternative narratives, stories, themes, or scenes associated with the user-solvable puzzle.

5. The method of claim 1, wherein:

the one or more user-manipulable control elements comprise at least two different and distinct control elements configured to cause at least two of the plurality of different, distinct, visibly distinguishable, continuous, and extensible line elements to expand and contract along their one or more predetermined associated paths in the image area to form at least a portion of the line drawing comprising at least the humanly discernible portion of the at least one image that constitutes the at least a portion of the solution to the user-solvable puzzle associated with the plurality of different and distinct images; and the method comprises receiving, by the one or more computing devices, user input via the at least two different and distinct control elements such that the at least two of the plurality of different, distinct, visibly distinguishable, continuous, and extensible line elements expand and contract along their one or more predetermined associated paths in the image area to form the at least a portion of the line drawing comprising at least the humanly discernible portion of the at least one image that constitutes the at least a portion of the solution to the user-solvable puzzle associated with the plurality of different and distinct images.

6. The method of claim 5, wherein:

the at least two different and distinct control elements comprise at least:

a first control element configured to cause a first of the at least two of the plurality of different, distinct, visibly distinguishable, continuous, and extensible line elements to expand and contract along its one or more predetermined associated paths in the image area to form at least a first portion of the line drawing comprising at least the humanly discernible portion of the at least one image that constitutes the at least a portion of the solution to the user-solvable puzzle associated with the plurality of different and distinct images, and a second control element configured to cause a second of the at least two of the plurality of different, distinct, visibly distinguishable, continuous, and extensible line elements to expand and contract along its one or more predetermined associated paths in the image area to form at least a second portion of the line drawing comprising at least the humanly discernible portion of the at least one image that constitutes the at least a portion of the solution to the user-solvable puzzle associated with the plurality of different and distinct images; and the method comprises receiving, by the one or more computing devices, user input via:

the first control element such that the first of the at least two of the plurality of different, distinct, visibly distinguishable, continuous, and extensible line elements expands and contracts along its one or more predetermined associated paths in the image area to form the at least a first portion of the line drawing comprising at least the humanly discernible portion of the at least one image that constitutes the at least a portion of the solution to the user-solvable puzzle associated with the plurality of different and distinct images, and the second control element such that the second of the at least two of the plurality of different, distinct, visibly distinguishable, continuous, and extensible line elements expands and contracts along its one or more predetermined associated paths in the image area to form the at least a second portion of the line drawing comprising at least the humanly discernible portion of the at least one image that constitutes the at least a portion of the solution to the user-solvable puzzle associated with the plurality of different and distinct images.

7. The method of claim 1, comprising receiving, by the one or more computing devices, user input selecting one or more portions of the plurality of different, distinct, visibly distinguishable, continuous, and extensible line elements and configuring the one or more portions of the plurality of different, distinct, visibly distinguishable, continuous, and extensible line elements to at least one of be removed from within the image area, fail to be displayed within the image area, or have their prominence or appearance at least one of reduced or altered within the image area such that the image area more prominently depicts at least a portion of the line drawing comprising at least the humanly discernible portion of the at least one image that constitutes the at least a portion of the solution to the user-solvable puzzle.

8. The method of claim 7, wherein each of the one or more portions of the plurality of different, distinct, visibly distinguishable, continuous, and extensible line elements comprises at least one or more portions of a common line element from amongst the plurality of different, distinct, visibly distinguishable, continuous, and extensible line elements.

9. The method of claim 7, wherein each of the one or more portions of the plurality of different, distinct, visibly distinguishable, continuous, and extensible line elements comprises at least one or more portions of different and distinct line elements from amongst the plurality of different, distinct, visibly distinguishable, continuous, and extensible line elements.

10. The method of claim 1, wherein the image area comprises one or more of text or graphics that at least one of pose a question, prompt a response, or provide a clue regarding at least one aspect of the solution to the user-solvable puzzle.

11. The method of claim 10, wherein the image area comprises at least two different and distinct user-invokable elements configured to, responsive at least in part to user invocation, display within the image area one or more of multiple different and distinct responsive text segments or graphics to the at least one of the question, prompt, or clue.

12. The method of claim 1, wherein the user-solvable puzzle comprises at least two different and distinct puzzles associated with the plurality of different and distinct images.

13. The method of claim 12, wherein a first of the at least two different and distinct puzzles comprises a second of the at least two different and distinct puzzles.

14. The method of claim 12, wherein at least one of the at least two different and distinct puzzles comprises a gridlock puzzle comprising at least one empty space and multiple different tiles, each of which depicts a different and distinct image of the one or more of the plurality of different, distinct, visibly distinguishable, continuous, and extensible line elements at least one of expanded or contracted along their one or more predetermined associated paths in the image area to form the line drawing comprising at least the humanly discernible portion of the at least one image that constitutes the at least a portion of the solution to the user-solvable puzzle.

15. A system comprising:
one or more processors; and
a memory storing instructions that when executed by the one or more processors cause the system to perform operations comprising:
generating and displaying a graphical user interface (GUI) comprising:
an image area for rendering a plurality of different and distinct images including at least one image that constitutes at least a portion of a solution to a user-solvable puzzle associated with the plurality of different and distinct images, and
one or more user-manipulable control elements configured to cause one or more of a plurality of different, distinct, visibly distinguishable, continuous, and extensible line elements to expand and contract along one or more predetermined associated paths in the image area to form a line drawing comprising at least a humanly discernible portion of the at least one image that constitutes the at least a portion of the solution to the user-solvable puzzle associated with the plurality of different and distinct images, wherein each of the plurality of different, distinct, visibly distinguishable, continuous, and extensible line elements is associated with a different, distinct, and alternative narrative, story, theme, or scene associated with the user-solvable puzzle;
receiving user input via the one or more user-manipulable control elements such that the one or more of the plurality of different, distinct, visibly distinguishable, continuous, and extensible line elements expand and contract along their one or more predetermined associated paths in the image area to form the line drawing comprising at least the humanly discernible portion of the at least one image that constitutes the at least a portion of the solution to the user-solvable puzzle associated with the plurality of different and distinct images; and
displaying, in the image area, the line drawing comprising at least the humanly discernible portion of the at least one image that constitutes at least a portion of the solution to the user-solvable puzzle associated with the plurality of different and distinct images.

16. The system of claim 15, wherein:
the one or more user-manipulable control elements comprise at least one common control element configured to cause the one or more of the plurality of different, distinct, visibly distinguishable, continuous, and extensible line elements to expand and contract along their one or more predetermined associated paths in the image area to form at least a portion of the line drawing comprising at least the humanly discernible portion of the at least one image that constitutes the at least a portion of the solution to the user-solvable puzzle associated with the plurality of different and distinct images; and
the operations comprise receiving user input via the at least one common control element such that the one or more of the plurality of different, distinct, visibly distinguishable, continuous, and extensible line elements expand and contract along their one or more predetermined associated paths in the image area to form the at least a portion of the line drawing comprising at least the humanly discernible portion of the at least one image that constitutes the at least a portion of the solution to the user-solvable puzzle associated with the plurality of different and distinct images.

17. The system of claim 15, wherein:
the one or more user-manipulable control elements comprise at least two different and distinct control elements configured to cause at least two of the plurality of different, distinct, visibly distinguishable, continuous, and extensible line elements to expand and contract along their one or more predetermined associated paths in the image area to form at least a portion of the line drawing comprising at least the humanly discernible portion of the at least one image that constitutes the at least a portion of the solution to the user-solvable puzzle associated with the plurality of different and distinct images; and
the operations comprise receiving user input via the at least two different and distinct control elements such that the at least two of the plurality of different, distinct, visibly distinguishable, continuous, and extensible line elements expand and contract along their one or more predetermined associated paths in the image area to form the at least a portion of the line drawing comprising at least the humanly discernible portion of the at least one image that constitutes the at least a portion of the solution to the user-solvable puzzle associated with the plurality of different and distinct images.

18. One or more non-transitory computer-readable media comprising instructions that when executed by one or more computing devices cause the one or more computing devices to perform operations comprising:
generating and displaying a graphical user interface (GUI) comprising:
an image area for rendering a plurality of different and distinct images including at least one image that constitutes at least a portion of a solution to a user-solvable puzzle associated with the plurality of different and distinct images, and
one or more user-manipulable control elements configured to cause one or more of a plurality of different, distinct, visibly distinguishable, continuous, and extensible line elements to expand and contract along one or more predetermined associated paths in the image area to form a line drawing comprising at least a humanly discernible portion of the at least one image that constitutes the at least a portion of the solution to the user-solvable puzzle associated with the plurality of different and distinct images, wherein each of the plurality of different, distinct, visibly distinguishable, continuous, and extensible line elements is associated with a different, distinct, and alternative narrative, story, theme, or scene associated with the user-solvable puzzle;

receiving user input via the one or more user-manipulable control elements such that the one or more of the plurality of different, distinct, visibly distinguishable, continuous, and extensible line elements expand and contract along their one or more predetermined associated paths in the image area to form the line drawing comprising at least the humanly discernible portion of the at least one image that constitutes the at least a portion of the solution to the user-solvable puzzle associated with the plurality of different and distinct images; and displaying, in the image area, the line drawing comprising at least the humanly discernible portion of the at least one image that constitutes the at least a portion of the solution to the user-solvable puzzle associated with the plurality of different and distinct images.

19. The one or more non-transitory computer-readable media of claim 18, wherein:

the one or more user-manipulable control elements comprise at least one common control element configured to cause the one or more of the plurality of different, distinct, visibly distinguishable, continuous, and extensible line elements to expand and contract along their one or more predetermined associated paths in the image area to form at least a portion of the line drawing comprising at least the humanly discernible portion of the at least one image that constitutes the at least a portion of the solution to the user-solvable puzzle associated with the plurality of different and distinct images; and the operations comprise receiving user input via the at least one common control element such that the one or more of the plurality of different, distinct, visibly distinguishable, continuous, and extensible line elements expand and contract along their one or more predetermined associated paths in the image area to form the at least a portion of the line drawing comprising at least the humanly discernible portion of the at least one image that constitutes the at least a portion of the solution to the user-solvable puzzle associated with the plurality of different and distinct images.

20. The one or more non-transitory computer-readable media of claim 18, wherein:

the one or more user-manipulable control elements comprise at least two different and distinct control elements configured to cause at least two of the plurality of different, distinct, visibly distinguishable, continuous, and extensible line elements to expand and contract along their one or more predetermined associated paths in the image area to form at least a portion of the line drawing comprising at least the humanly discernible portion of the at least one image that constitutes the at least a portion of the solution to the user-solvable puzzle associated with the plurality of different and distinct images; and the operations comprise receiving user input via the at least two different and distinct control elements such that the at least two of the plurality of different, distinct, visibly distinguishable, continuous, and extensible line elements expand and contract along their one or more predetermined associated paths in the image area to form the at least a portion of the line drawing comprising at least the humanly discernible portion of the at least one image that constitutes the at least a portion of the solution to the user-solvable puzzle associated with the plurality of different and distinct images.

* * * * *